US007653579B2

(12) United States Patent
Dawson

(10) Patent No.: US 7,653,579 B2
(45) Date of Patent: *Jan. 26, 2010

(54) APPARATUS AND METHODS FOR HANDLING TRADING DATA

(75) Inventor: Brian T. Dawson, Kirknewton (GB)

(73) Assignee: The World Markets Company PLC, Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/247,045

(22) Filed: Oct. 7, 2008

(65) Prior Publication Data

US 2009/0089223 A1 Apr. 2, 2009

Related U.S. Application Data

(63) Continuation of application No. 09/972,193, filed on Oct. 9, 2001, now Pat. No. 7,433,837.

(30) Foreign Application Priority Data

Oct. 9, 2000 (GB) ................................. 0024671.0

(51) Int. Cl.
*G06Q 40/00* (2006.01)
(52) U.S. Cl. .......................... 705/35; 705/37; 705/36 R
(58) Field of Classification Search .................. 705/35, 705/37, 36 R
See application file for complete search history.

(56) References Cited

U.S. PATENT DOCUMENTS 5,025,391 A 6/1991 Filby et al.

6,876,981 B1 4/2005 Berckmans

FOREIGN PATENT DOCUMENTS

GB 1352742 5/1974

OTHER PUBLICATIONS

Barron's Dictionary of Finance and investment Terms Fourth Edition Copyright 1995.
Charles Schwab website about Mutual Fund Investing at Schwab, Mar. 4, 2000.

*Primary Examiner*—James P Trammell
*Assistant Examiner*—Scott S Trotter
(74) *Attorney, Agent, or Firm*—Irah H. Donner; Wilmer Cutler Pickering Hale and Dorr LLP

(57) ABSTRACT

A manually-assisted computer and communications apparatus is provided for periodically fixing a price of a currency or commodity. Successive rate samples of said currency/stock/commodity are received from a plurality of sources (80) over a period of time, recorded and filtered automatically (90) by reference to said historical record and predetermined validation criteria so as to categorize certain samples as valid or erroneous. The received & filtered samples are combined periodically (105-115) so as to derive a fixed rate, which is then released (120) to users. The filtering means distinguishes between rate samples of different contributors within the samples received from a given source, and also receives (OTR1) trading rates generated by an online trading system, in addition to rates quoted by other contributors. Trading rates are applied in said fixed rate in preference to quoted rates. Traders and clients contract (450, 455) to buy and sell currency at rates to be fixed by the apparatus at a future time.

50 Claims, 11 Drawing Sheets

Major Spot

| Name | Bid | Ask | Updated |
|---|---|---|---|
| Japanese Yen | 108.90 | 108.95 | 21:57 GMT / 02 AUG 2000 |
| British Pound | 1.4950 | 1.4953 | 21:57 GMT / 02 AUG 2000 |
| French Franc | 7.1807 | 7.1831 | 22:00 GMT / 02 AUG 2000 |
| Swiss Franc | 1.6877 | 1.6882 | 21:59 GMT / 02 AUG 2000 |
| German Mark | 2.1410 | 2.1417 | 22:00 GMT / 02 AUG 2000 |
| Canadian Dollar | 1.4791 | 1.4801 | 21:16 GMT / 02 AUG 2000 |
| Italian Lira | 2119.62 | 2120.31 | 22:00 GMT / 02 AUG 2000 |
| Dutch Guilder | 2.4124 | 2.4132 | 22:00 GMT / 02 AUG 2000 |
| Belgian Franc | 44.160 | 44.174 | 22:00 GMT / 02 AUG 2000 |
| Swedish Krona | 9.2480 | 9.2575 | 20:07 GMT / 02 AUG 2000 |
| Hong Kong Dollar | 7.7985 | 7.7990 | 20:45 GMT / 02 AUG 2000 |
| Singapore Dollar | 1.7260 | 1.7265 | 20:45 GMT / 02 AUG 2000 |
| Australian Dollar | 0.5845 | 0.5850 | 21:58 GMT / 02 AUG 2000 |

Quotes and other data are provided for information only, and are not intended for trading purposes.
All data is delayed by at least 15 minutes.

Fig 1C

APPARATUS AND METHODS FOR HANDLING TRADING DATA

RELATED APPLICATIONS

This application is a Continuation of U.S. application Ser. No. 09/972,193 filed Oct. 9, 2001, now U.S. Pat. No. 7,433,837, which is incorporated herein by reference.

FIELD OF THE INVENTION

The present invention relates primarily to an improved apparatus and methods for establishing and verifying fixed currency or commodity prices. The invention further relates to methods of trading in different currencies, commodities or the like, and to methods of valuing assets held in a plurality of currencies.

The invention relates generally to any liquid market which is operated by multiple market makers, and prices are being set based on real time reports of prices. Instances of such trading include order trading of commodities where trading is "screen" based, where the buy and sell price of a commodity is displayed and transactions carried out using a specialised terminal. Currency exchanges and money markets are other examples of such markets, and the term "price" as used herein is intended to encompass prices of money deposits, commodities and also exchange rates, which are merely the price of one currency expressed in terms of another.

Concerning currency exchange rates as the primary example for the purposes of this description, business today is carried out on a world-wide basis, twenty-four hours a day, in numerous major and minor currencies. It is clearly desirable that the rates applied in transactions and valuations are both up to date and reliable. Ideally, the rates should be simply and rapidly obtainable. However, only at the time of making a transaction do the parties truly know what exchange rate applies.

It would be advantageous if banks could guarantee to clients and to one another in advance fixed rates for executing trades. Similarly, portfolio managers need to be able to evaluate portfolios as well as verify the validity of currency transactions carried out by banks for their portfolios. Corporate treasury departments also have a need to obtain exchange rates for many different purposes, including use as a common standard for valuation of company assets and as a standard for transfers of currency assets between geographic areas.

Many organisations use approximate rates for internal accounting purposes, for example based on the daily quoted "closing rates" such as are provided by the present applicant in conjunction with Reuters™ news agency. These approximate valuations introduce risk. Although losses and gains will tend to balance over time, there can be exceptions, and in any event burdensome reconciliation procedures are involved whenever currency is actually bought and sold and the actual rate of exchange is discovered. Major banks, too, will quote exchange rates on a daily basis, but these are not necessarily representative of actual trading conditions A verifiable and agreed standard for fixing rates for currency transactions on a continuous, or at least more regular, basis would assist many such organisations in their normal course of business.

Furthermore, an emergent demand lies in so-called electronic or e-commerce. An expanding number of products and services are being offered "online". Many of these sell world-wide which calls for the currency conversion of their products or services from their base currency into the currency of their client. Other internet based trading and financial services directly call for access to verified exchange rates. For such automated transactions there is obviously a desire for quoted rates to be honoured, and consequently there is a need for fixed rates which are up-to-date and well verified in order to minimise risk for the trader. To maintain the benefits of electronic commerce, requirements for human intervention must be kept to a minimum.

Exchange rates for currency conversion can presently be obtained in a variety of ways.

The simplest method is to refer to a daily financial publication which carries quotations directly from the currency markets. Such information will almost certainly be out of date by a significant factor as the data needs to be collected then collated and, finally, physically published. Online publishing is of course a partial solution, for example via the WM Company™ website. Although these give a useful indicator as to the prevailing exchange rate they generally are fixed at close of business per day, and after significant manual validation. Therefore such rates are inherently out-of date, and certainly a quote of yesterday's closing price does not guarantee a price at which a transaction can be carried out today.

Internet based services such as that offered by Thomas Cook at www.fx4business.com give customers the opportunity to carry out currency transactions via an online ordering system. This allows automated currency transactions to be carried out over the internet, but for purchase of cash and with a wider spread than in the inter-bank market.

A wide spread in any kind of trading is not desirable and not in the interest of the customer, adding unnecessary expense to trading. The actual amount of the spread may be decided arbitrarily by the trader providing the service, and fails to impart assurance about the trading prices used.

The inventors have recognised that some or all of the drawbacks of current systems, as described above, can be reduced by a novel apparatus for fixing exchange rates to fix rates authoritatively throughout the day. This in turn permits novel and streamlined modes of business, in which the rate so fixed is regarded as a standard between third parties, and used as the basis of actual trading. This can reduce risk for all concerned, and eliminate the burdensome reconciliation procedures and delays inherent in systems available hitherto.

It is an independent object of the invention to provide an improved method of monitoring varying currency/stock/commodity prices.

It is an independent object of the invention to provide an improved method of establishing and verifying fixed currency/stock/commodity prices.

It is an object of the invention to provide methods and apparatus capable of fixing a currency/stock/commodity price more rapidly than hitherto, and in particular methods in which the resulting prices are acceptable as a standard for trading between third parties.

It is an independent object of the invention to provide novel and efficient tools for the valuation of currencies/stocks/commodities and portfolios thereof, and for automated reporting and or trading of different between currencies/stocks/commodities.

It is an independent object of the invention to provide novel and more efficient methods of trading in currencies/stocks/commodities, in particular by a contract to trade at a rate to be fixed by an agreed methodology, particularly by an independent, trusted third party.

In a first aspect, the invention provides an apparatus for periodically fixing a price of a currency/stock/commodity, the apparatus comprising computer and communications apparatus including:

means for electronically receiving successive price samples of said currency/stock/commodity from a plurality of sources over a period of time;

means for recording the received sample values so as to form an historical record of price samples from each source;

means for filtering the received price sample values automatically by reference to said historical record and predetermined validation criteria so as to categorise certain samples as valid or erroneous;

means for combining the received samples periodically while excluding the erroneous samples so as to derive a fixed price; and means for releasing said fixed price to users.

The recording means and filtering means may be arranged to distinguish between price samples of different contributors within the samples received from a given source.

The receiving means may be arranged to receive from at least one source samples of trading prices offered in actual orders, in addition to prices quoted by other contributors.

The source of trading prices may comprise an online trading apparatus, wherein binding buy and sell orders incorporating prices are accepted and ranked by price in respective order lists, compatible buy and sell orders being matched automatically in order of price to conclude a transaction, the receiving means being arranged to receive the current best price from each of the buy and sell order lists for use in deriving said fixed price.

Prices derived from binding offers in an automated trading system are inherently more authoritative than non-binding quotes provided by various information providers, including banks who may wish to influence the market in light of their own position in a given currency, stock or commodity.

The filtering means may be arranged to process trading prices and quoted prices according to different criteria. The combining means may be arranged to apply different processing to the trading prices and the quoted prices, to arrive at said fixed price. The combining means may be arranged for example to generate an average of price samples, in which trading prices are weighted higher than quoted prices. Alternatively, the combining means may be arranged to discard information derived from quoted prices in favour of information derived from trading prices, subject to predetermined validation criteria. Said validation criteria may be such as to permit substitution by trading price information provided that it is within certain tolerance limits derived from the quoted prices. In practice, quotes are always a minute or two behind the market.

The filtering means may be arranged to categorise certain samples firstly as either valid or questionable, and subsequently to re-categorise questionable samples automatically as valid or erroneous depending on samples received subsequently in accordance with predetermined criteria.

The filtering means may be arranged to distinguish between price samples coming from various specific contributors, said re-categorisation being performed in a manner dependent on whether samples received subsequently are from the same contributor as the questionable sample or a different contributor.

The filtering means may include human intervention means for displaying questionable samples and surrounding data and for permitting human intervention to determine use or non-use of the questionable samples.

The apparatus may include means for defining finite fixing periods and intervening periods, each fixing period arising at a predetermined time of day. In the one embodiment, each fixing period extends one minute either side of the hour, throughout the business day.

Said filtering means may be arranged to operate throughout said fixing periods and intervening periods, samples received during said intervening periods serving as a reference for the categorisation of samples received during said fixing period.

In a preferred embodiment, exchange rate quotes are captured on a round-the-clock (RTC) basis, by sampling (snapping) the data at regular intervals. Only those samples (snaps) that fall within a fix period are used to calculate a fixed spot rate; the other samples used to monitor the behaviour of the market, so that anomalies which may impact the next fix can be identified and analysed ahead of time.

The invention in its first aspect further provides a method of fixing prices for periodically fixing a rate of a currency, stock or commodity, and to record carriers and other media conveying the resulting fixed prices, and also to media conveying computer implementable instructions for causing a general purpose computer or system of computers to implement the method or apparatus according to any aspect of the invention as set forth above.

In a second aspect the invention provides for an apparatus for the real time acquisition and evaluation of data comprising:

input means for acquiring at least one series of data samples from at least one source;

first processing means for storing the data acquired over a period of time as pair of an historical record;

second processing means for assigning to said acquired data an indicator value indicating a level of confidence in said acquired data according to predetermined parameters and said historical record; and means for outputting said data and said indicator value and associated data.

The apparatus may comprise third processing means for processing the data automatically in a manner dependent on the indicator value.

In one embodiment the apparatus is arranged to receive a plurality of different data types from a plurality of sources and store these in a database so as to form the historical record while also evaluating the validity of the acquired data. The data may be acquired, for example, over a computer network and the database stored in a computer database and the resultant indicator value or other data associated similarly outputted over a computer network.

The network may be any specialised or general computer network such as an Intranet, Extranet, or the internet.

The second processing means may be arranged to categorise certain samples firstly as either valid or questionable, and subsequently to re-categorise questionable samples automatically as valid or erroneous depending on samples received subsequently in accordance with predetermined criteria.

The second processing means may be arranged to distinguish between samples coming from various specific contributors, said re-categorisation being performed in a manner dependent on whether samples received subsequently are from the same contributor as the questionable sample or a different contributor.

The second processing means may include human intervention means for displaying questionable samples and surrounding data samples and permitting human intervention to alter the confidence level samples.

The data samples may comprise prices of one or more currency, commodity or stock items. The apparatus may serve as the filtering means in an apparatus embodying the first aspect of the invention, as set forth above.

The invention in its second aspect further provides a method of real time acquisition and evaluation of data, and to record carriers and other media conveying the resulting fixed prices, and also to media conveying computer implementable instructions for causing a general purpose computer or system of computers to implement the method or apparatus according to any aspect of the invention as set forth above.

According to a third aspect of the invention, there is provided a method of trading in a currency, stock or commodity between a dealing party, a plurality of clients and trusted third party independent of the dealing party the trusted third party periodically fixing and a price for said currency/stock/commodity at a predetermined fixing time and according to predetermined criteria, the method comprising:

(a) the dealing party accepting from each client prior to said fixing time binding orders to trade quantities of said currency/stock/commodity at a price defined by reference to the price to be fixed by said trusted third party, as yet unknown;

(b) the dealing party receiving from said trusted third party after said fixing time a record of the price fixed at the fixing time; and (c) the dealing party settling the received orders with each client in accordance with said price defined by reference to the fixed price.

The trusted third party may fix said price at a series of predetermined fixing times throughout the day, the steps (a) to (c) being repeated in relation to each fixing time.

In step (a), orders may be accepted during a predetermined period ending in advance of the or each fixing time, orders received after the end of said period being accepted with reference to a later fixing time.

The method may further comprise:

(d) the dealing party offsetting a plurality of buy and sell orders received from clients prior to the or each fixing time to determine a balance of said currency/stock/commodity traded with reference to the fixed price; and (e) the dealing party dealing in an open market to reconcile the balance, the volume of such trading being substantially less than the aggregate of the buy and sell orders accepted.

The trusted third party may apply a method or apparatus according to the first aspect of the invention, in order to fix said price.

The invention in its third aspect further provides an apparatus and system of apparatuses for trading in a currency, stock or commodity, and to record carriers and other media conveying the resulting orders, and also to media conveying computer implementable instructions for causing a general purpose computer or system of computers to implement the method or apparatus according to the second aspect of the invention as set forth above.

The invention in its various aspects is described as providing or using "intra-day" prices, for example on an hourly basis, rather than daily closing prices. Needless to say, the frequency and regularity with which prices are updated is a matter of choice for the implementers of a given system.

Similarly, details such as the exact number of samples of each type, the weighting given to each type of input will be a matter of choice for the implementer of the system, to satisfy the customer or customers.

The above and other aspects of the invention will be apparent from a consideration of the examples which follow. While the invention will be described in the context of a system for setting currency exchange rates on a real time basis, it should be appreciated that the invention can also be adapted to the pricing of commodities, and also to the pricing of derivatives of currency and commodity prices. References to "price" in the present description and claims should therefore be construed as including "rate", and references to "currency" are to be construed as including "commodity". It is of course a matter of judgement in each case whether the market provides sufficient different sources of quotes and or trade prices to yield a useful output. Note that derivative products tend to be calculated on a formula from the spot rate.

BRIEF DESCRIPTION OF THE DRAWINGS

Embodiments of the invention will now be described, by way of example only, by reference to the accompanying drawings, in which:

FIG. 1C illustrates a typical form of information generated by the system of FIG. 1B;

DETAILED DESCRIPTION OF THE EMBODIMENTS

Background

Figure 1A:
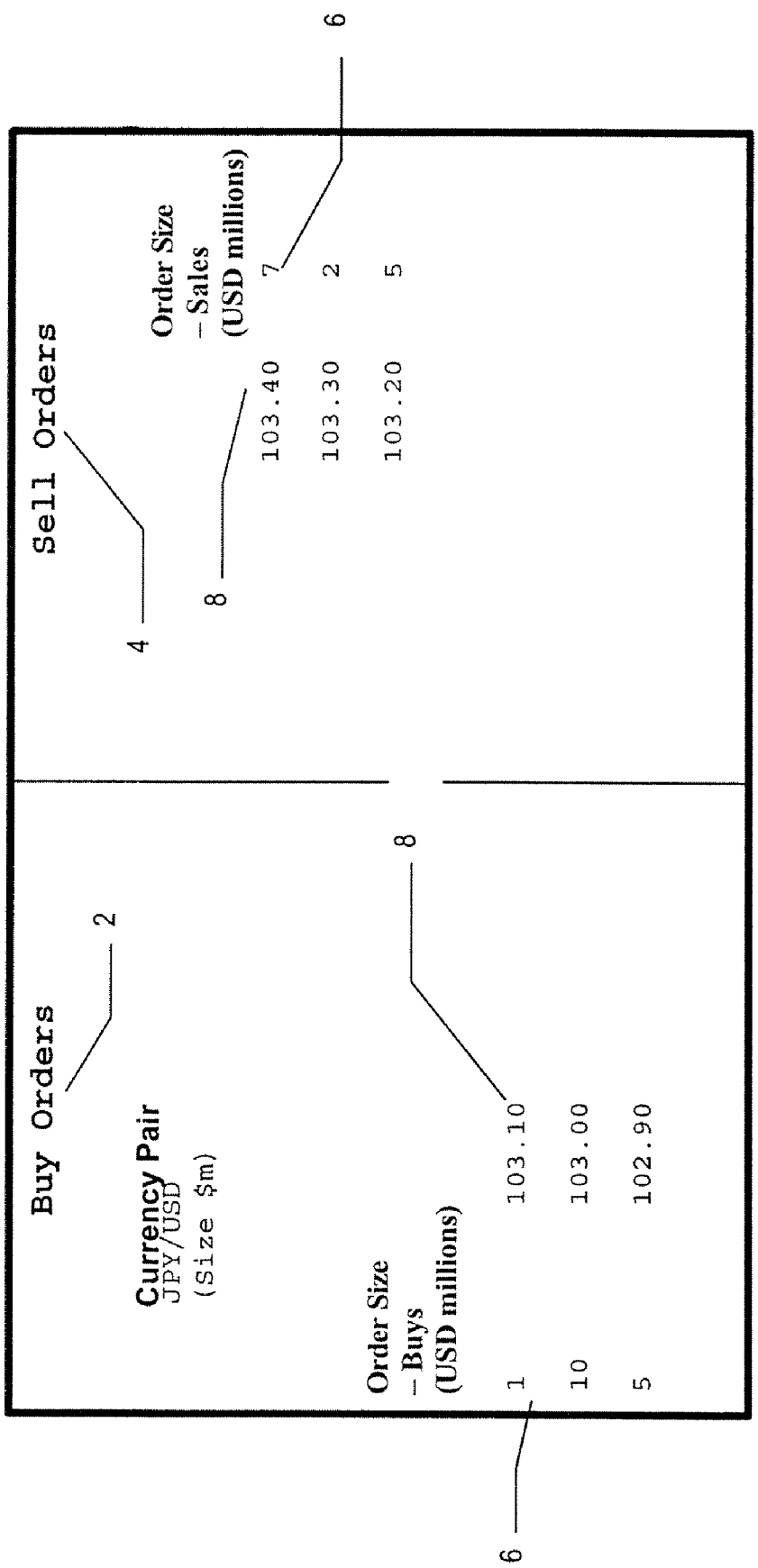
FIG. 1A is a representation of an example screen of a known form of online inter-bank trading system.

FIG. 1A is a representation of an example screen of a known form of online inter-bank trading system. This displays an example screen on which orders 2, 4 can be entered. These can be either buy orders 2 or sell orders 4. Each order consists of an amount of currency 6 and a binding price 8. The system organises these by price within buy orders and sell orders. If the price of a buy order and the price of a sell order are the same, the system automatically matches the two orders (or one order against part of the other order if the amount of currency is different) and generates a trade between the two parties.

By convention an exchange rate between two currencies X and Y (the X:Y exchange rate) is normally expressed as the number of currency Y (the variable currency) equal to 1 unit of currency X (the base currency). The base currency is normally written on the left, with the variable currency on the right i.e. base:variable. There is always one of the base currency, and a variable number of the variable currency. For example if the US dollar: Japanese yen exchange rate (USD: JPY) is 106.9, this means that 1 US dollar is worth 106.9 Japanese yen. In this example, the US dollar is the base currency, and the Japanese yen is the variable currency.

Note that any exchange rate can be re-expressed using the variable currency as the base currency (and vice-versa) simply by taking the reciprocal of the rate, i.e. 1/rate.

In practice, only the US dollar (and recently the Euro) are commonly used as base currencies—most currencies are expressed relative to either the US dollar or the Euro. An exchange rate between two currencies A and B of which neither is the US dollar is known as a cross rate. Such rates are usually calculated by converting to and from US dollars using the USD:X and USD:Y exchange rates. (Note that if either of those rates is inverted, then it will have to be re-based before the calculation is performed).

Since the introduction of the Euro, certain European currencies are more closely related to the Euro than to the US dollar. For this reason, rates for those currencies are normally quoted using the Euro as the base currency. When calculating a cross rate to another Euro-based currency, the EUR:X and EUR:Y rates will be used instead of the USD:X and USD:Y rates.

When crossing from a Euro-based currency to a US dollar-based currency, the EUR:X, USD:Y and EUR:USD exchange rates will be used. The EUR:USD exchange rate is therefore a very important rate, since it will be used to calculate cross rates for a wide range of currencies.

Certain currencies are said to be pegged to another currency (or basket of currencies) if their exchange rate against that currency (the peg) is constrained to fall within a certain range. For example, the Hong Kong dollar is pegged against the US dollar.

An exchange rate quote from an institution for a given pair of currencies normally consists of two rates. These indicate the rate at which the institution is prepared to buy the base currency against the variable currency (the bid rate for the base currency), and at what rate it is prepared to sell the base currency against the variable currency (the offer rate for the base currency).

The bid rate is always lower than the offer rate. The difference between these two rates is known as the bid-offer spread (or simply spread), and the average of these two rates is referred to as the mid rate A trade occurs when a buyer actually purchases a given amount of a certain currency. The size (or volume) of the trade is expressed in the base currency. Trades are thought to give a better indication of the real value of a currency than quotes.

Note that trades occur at a fixed point in time, whereas quotes are normally considered valid until they are replaced by a new quote. In practice, a recent trade is still a good indication of the current value, and an old quote may be considered increasingly dubious.

Quotes and trades are presented on data providers such as Reuters as soon as possible after they happen, with the most recent quote or trade always displayed, replacing any previous quotes or trades. Quotes and trades happen at unpredictable times, and so any given quote or trade may be displayed for several days, or only for a few seconds.

Figure 1B:
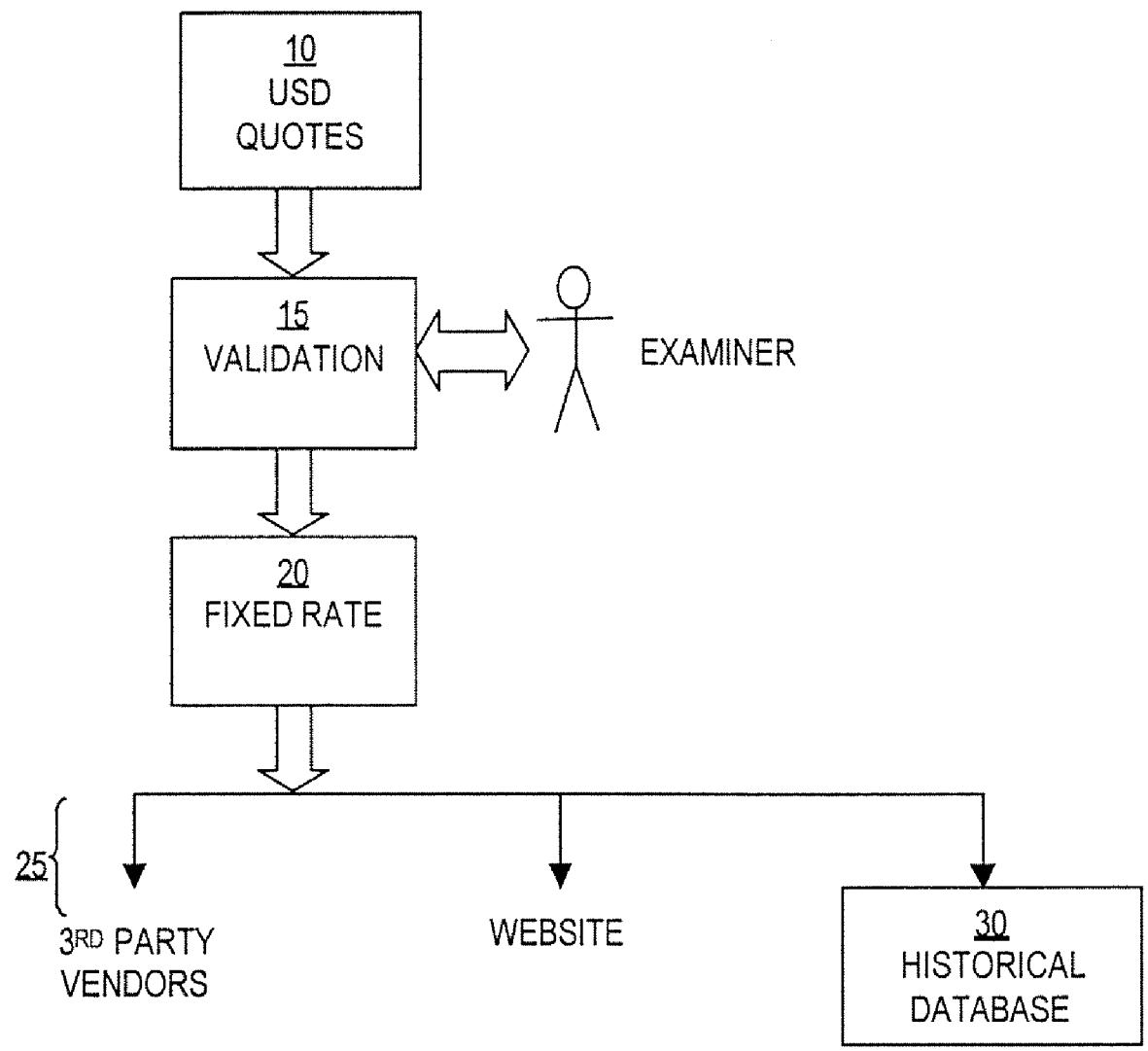
FIG. 1B is a schematic block diagram illustrating a known method for fixing and disseminating "closing" exchange rates for information purposes.

For quotes, the data provider supplies:
The time of the quote
The base currency (this may be implicit)
The variable currency
The institution making the quote
The bid and offer rates
For trades, the data provider supplies:
The time of the trade
The base currency
The variable currency
The bid and offer rates FIG. 1B illustrates a method for displaying daily closing rates for currency exchange. FIG. 1C illustrates one form of output from the known method as presently implemented.

In this example, quotes of "bid" and "asked" currency rates against the US dollar (USD) are obtained from various contributors via the Reuters network. This is a network of display terminals through which Reuters collects currency rates from contributing banks. The quotes are captured over a pre-determined time interval about the time of fixing and are captured as a quotes data set 10. The time of fixing is presently determined to be 1600 hours GMT.

Unless otherwise stated, the times referred to herein are generally UK times, using the 24-hour clock, being GMT in Wintertime and GMT+1 in Summertime.

The purpose of the currency rates application is to calculate a representative fixed spot rate for each currency at certain key times (called fixes) during the day. The fixed spot rate comprises a bid and offer rate, which together represent the value of the currency (relative to a base currency) at that point in time (called the fix time). The rate need not correspond to an quote or actual trade made exactly at the fix time.

The most important fix is the 4 pm fix, though there are other fixes during the day (mostly on the hour). All fixes run every weekday (except for some holidays). The fixed spot rate is calculated by sampling the continuous stream of data from the data provider(s) at evenly spaced intervals centred on the fix time. Each sample is called a snap, and the time between snaps is called the snap interval. The period from the first snap to the last is called the fix period.

Note that in the case of both quote data and trade data, the value at the time of a snap does not correspond to a quote or trade made exactly at the time of the snap. Rather, it is the value that was being presented by the data provider at the time of the snap. As noted above, the data provider always presents the most recent value, but this can in some cases be several days old.

This snapping technique does not favour one institution over another, nor does it favour large trades over small, etc. If there are several $10,000,000 trades at a rate of 100 followed by a $1,000,000 trade at a rate of 50 immediately before the snap, the $1,000,000 trade at 50 is still taken as the snapped value.

The median of the snapped bid rates (the median bid) and the median of the snapped offer rates (the median offer) are used as bid and offer rates for the fixed spot rate.

After the close of the capture interval, data set 10 is subjected to a validation process involving a number of tests before a fixed rate 20 is verified and arrived at. Each of these tests involve comparing the calculated value against a pre-determined value specific for each currency which has been set from previous experience of the market. The tests are automated to some extent, but if a rate fails any of the checks, the rate is checked by a human examiner using alternative sources and other data from before and after the time of the fix. The examiner may correct any rate which is judged to be incorrect, and may inhibit the production of any value, if reliable data is not available.

The fixed rate 20 can be output through a number of channels 25. The channels can take different forms of expression. For example, the fixed bid, asked and mid rate can be displayed on data vendors' media systems, sent in a file to clients or updated onto a website. FIG. 1B illustrates this last form of output, and it will be appreciated that various different formats are user-selectable for presentation of the same basic data. The data is also stored in a historical database 30 for further reference. This includes recent data used in the automated tests and by the examiner. Only the actual fix data is stored here permanently with no need to store the source data for more than twenty four hours.

The existing system just described is widely used and respected, but has limitations which preclude the more demanding applications envisaged in the introduction above. The data capture does not make use of rates applied in actual trading. Such information is theoretically available in real time, now that at least some currencies can be traded with on-line trading systems. Actual trading prices will be inherently a more authoritative source than quotes from mere information sources.

It is also desirable to have a shorter validation process 15. Having a single time of each day for fixing the rates is also a drawback, when the currency markets can fluctuate significantly in the course of a day. Consequently, customers using the known services do not obtain an exchange rate upon which they can rely in actual transactions.

The existing system also bases its quotes against a single reference currency (US dollar, USD), when many currencies nowadays are quoted against the euro (EUR). Reliance upon a single source of "bid" and "ask" quotes may also put the customer at a disadvantage. For, example, if USD exchange rates are relied upon as the sole source of currency information this may introduce errors into the calculations of customers who trade in currencies which have their primary quotes against the euro (EUR). Additionally, if the source of information is banking rates, this may not be as reliable for some trading purposes as others.

Apparatus Overview

Figure 2:
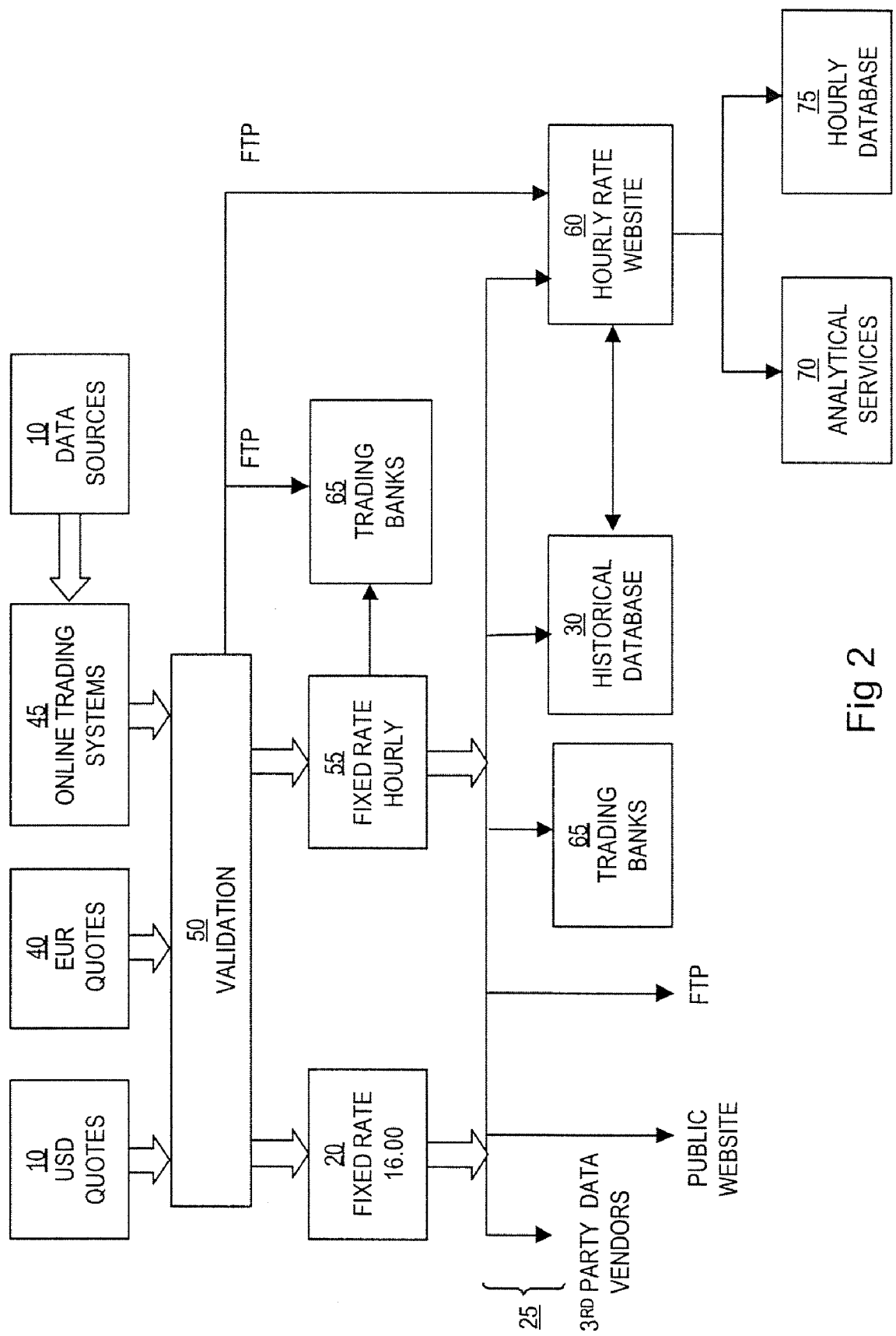
FIG. 2 is a block diagram of a apparatus for supplying fixed rates for currency exchange at least semi-automatically and on an hourly basis, in accordance with one embodiment of the present invention.

FIG. 2 is a block diagram of a novel apparatus for supplying fixed rates for currency exchange with greater authority and at greater frequency than the existing services. In particular, the apparatus is arranged to fix rates at intervals through the business day, for example every hour, and to provide the fixed rates more quickly than is possible via the human examination process of the existing system. The additional features which make this possible will now described.

In addition to an acquisition module 10 for capturing sets of USD-based quotes from various bank and other sources, a second module 40 captures quotes to the euro (EUR) for currencies where the euro defines the primary rates of publication. A third module 45 is further provided to gather a third data set comprising actual trading rates from online trading systems. The combined data sets are then processed by a validation module 50. Module 50 includes additional tests supplementary to and novel over the tests carried out in the existing system, as will be detailed later. The various quotes accessed by the system are continuously validated by module 50 at regular intervals throughout the day, between even outside the times of fixing. This allows for trends to be viewed for the currencies and additional analyses to be performed, if necessary.

Also, continuous error-trapping provides a more reliable background against which to test the samples during the fixing interval itself, as is described in more detail below.

At pre-determined times the system processes the validated exchange rates in module 55 to generate the desired fixed rates. In the present embodiment, for the sake of example only, module 55 produces a new fixed rate every hour for at least a group of currencies which can be output through the same channels 25 as before, and others newly defined. Fixed rates are sent to a web server 60 where they are presented in various forms to customers within as short a time as possible. A delay of between five and 10 minutes can be expected between making a fix and a this fix data being available for use.

The data is also supplied via communications module 65 to trading banks. The hourly rate web server 60 and the module 65 can also receive and disseminate information on validated rates outside the times of fixing. The historical database 30 is also provides copies of files containing historical information on previous fixed rates to the web server 60. The information from this web server can be accessed by/sent to a separate module 70 for analysis, perhaps at a customer site. A database 75 of hourly rates can also be assembled from the data files sent to the web server 60.

Whereas the daily closing rates may be made freely available to the public through the channels 25, other services such as the hourly rates and the historical data may be accessible to paying subscribers only. The transfer of information between the different modules may be implemented through a variety of means. For example, transfer of information to the hourly rate web server 60 and the trading banks 65 may be by File Transfer Protocol (FTP).

The web server 60 allows rates to be accessed by any other licensed website for the purpose of pricing their goods and services by converting their local currency into any of the currencies covered by the service. Customers can access reliable currency exchange rate information simply and easily, and can review the performance of one particular currency over time.

The trading banks 65 who trade in currencies will also receive a copy of the output fixed rate file—this can be used to support a service by which they will guarantee to clients to trade for them at the fixing time at the rate to be fixed by the service. By accepting such contracts, the parties reduce the overhead inherent in seeking the best rates and reconciling quoted and traded rates for every minor transaction. The file of rates can be used by the bank to compare the fixed rate supplied with the rate they have traded at for their clients and, if necessary, trade off any excess currency in the market to minimise their exposure to any particular currency.

The method by which a contract may be set up between two parties at a price fixed by a third party is explained in further detail later.

It will be understood that the various modules forming the apparatus of FIGS. 2 to 7 can be implemented in various ways, but typically by a combination of computer hardware and software, and communications links to apparatus of the same and other institutions, as sources and destinations of data. The invention is not limited in scope to any particular implementation. The different modules may or may not be physically separate in a particular embodiment, being implemented in stead by modules of program code sharing time on a common processing unit. For example, certain functions described as a single unit or module may be distributed over a Local Area Network, Wide Area Network, or the Internet, and intercommunicate accordingly.

Figure 3:
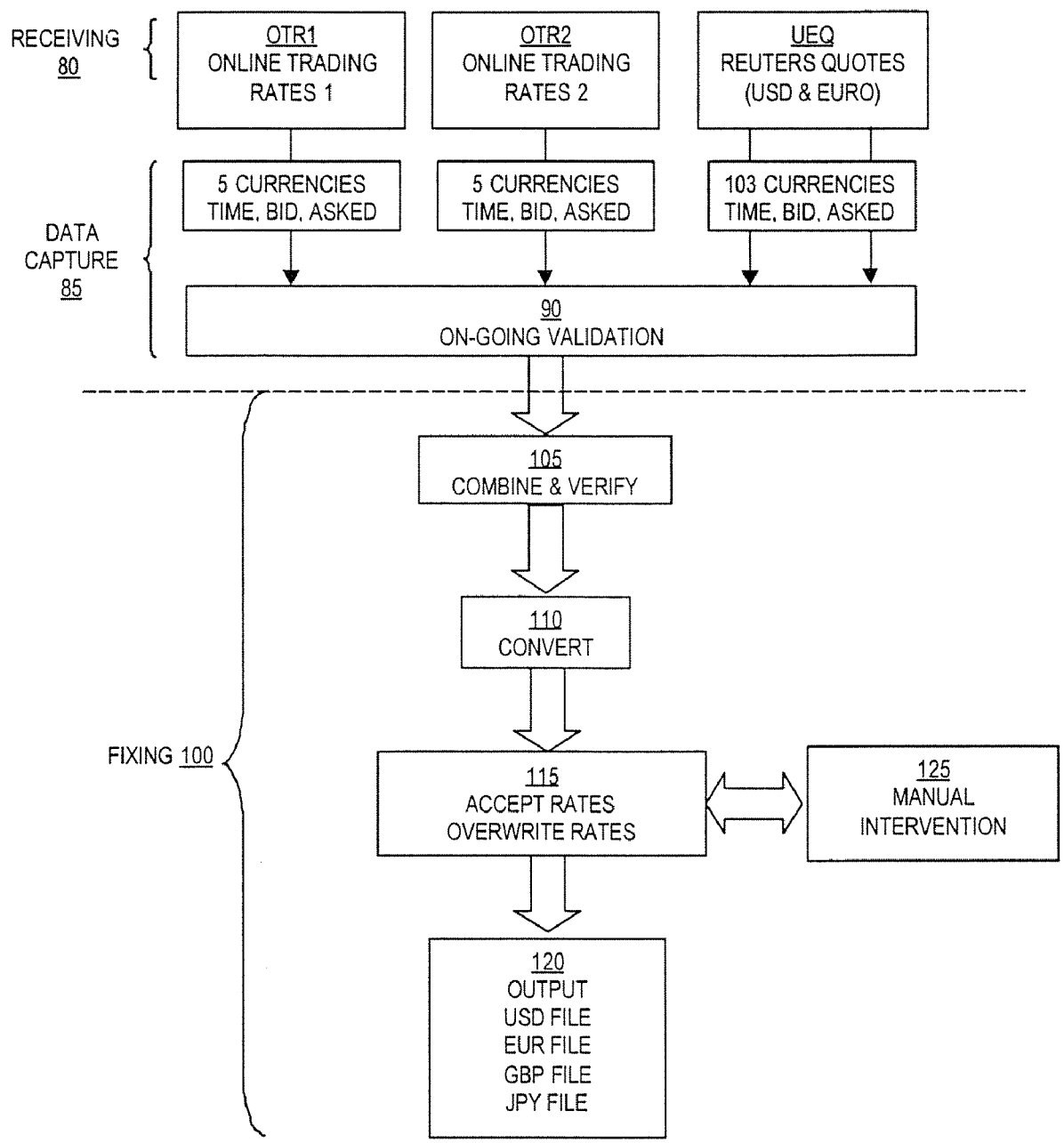
FIG. 3 is a flow diagram illustrating data capture and processing within the apparatus of FIG. 2.

FIG. 3 is a flow diagram giving an overview of the process implemented in the apparatus of FIG. 2 for supplying fixed rates for currency exchange. The process is divided into three principal stages: data sourcing 80, ongoing data capture 85 (including filtering for preliminary data validation 90), and fixing 100.

Firstly, the sourcing stage 80 identifies the sources from which the various data needed to arrive at the fixed rates can be requested and received. Three class of source are employed in the present embodiment, identified here as online trading rates 1 (OTR1), online trading rates 2 (OTR2), and USD/ELTR quotes (LEQ). Possible sources for the "bid" and "asked" quotes UEQ include vendors such as Reuters. Bid and asked trading rates can be obtained from on-line trading systems.

The next stage in the process is data capture 85. From the data received in sourcing step 80, a more specific data capture 85 is performed. In the embodiment illustrated here data on for example five currencies are captured from online trading source components OTR1 and OTR2 (different providers may provide a wider or more limited range of rates). Data on quotes for 103 currencies are captured from the USD/EUR source component UEQ. The captured rates and quotes undergo a process of validation 90 at this stage, corresponding to the filtering step referred to in the introduction above.

All time information is stored in GMT. GMT is considered preferable to local time because the system may be run 24 hours per day, in which case the system would be running when daylight saving time starts and stops. When the local time moves forward relative to GMT, there would be a 'lost' period. Worse, when local time moves backward relative to GMT, the same time period would be repeated.

Any input data will be converted from local time into GMT as appropriate, and output data will be converted from GMT into local time as required. All times will be displayed in the user interface as GMT, and will be marked "GMT" to avoid confusion. Since all fix times are actually expressed in local time (e.g. "the 4 pm fix"), whenever the time of a fix is displayed, both the local time and GMT time will be given.

In order that the application can accurately determine the current local time, it is important to ensure that the operating system date & time are correctly set, that the correct time zone is selected, and that automatic adjustment for daylight saving time is enabled.

In order to keep the system time as close to the correct time as possible and avoid 'drift', the application will automatically synchronise the system clock with an external time source once per day. The external time source is a matter of choice but is likely to be an existing internet-based system.

If the difference between the system clock and the time source is greater than a pre-defined limit such as 10 seconds, then the system clock will not be modified, and the operator will be alerted, since it is likely that this indicates a serious problem, possibly with the external source. This should avoid the application automatically setting the clock to a time that is clearly wrong.

The aim is to ensure that the accuracy of the system clock is within 1 second of the true time. It is not necessary to achieve greater accuracy than plus or minus 1 second.

During a fixing period the nominal time of fixing, the data gathered and filtered/validated are processed in a fixing process 100. The fixing times in this embodiment are on the hour, and the fixing period extends from one minute before to one minute after the nominal fixing time. Of course these parameters can be chosen to be otherwise. The fixing process comprises several component steps, to be described in more detail below. In summary, the validated data from step 90 undergoes a test stage 105 which performs calculations on the received exchange rate data to in order to arrive at a reliable fixed rate. Conversions between different base currencies can be implemented at 110. A final set of tests are performed at 115, and queries placed for the human operator at 125 to resolve. The operator can either accept or modify the calculated rates 115, whereupon and output files for fixed rates covering the chosen currencies are output at 120. In this embodiment these are quoted in four separate files against US dollars USD, euro EUR, Pounds sterling GBP and Japanese Yen JPY.

Data Capture

Describing this process in more detail, in the data capture stage 85, rates are captured every fifteen seconds throughout the day. Each sample will be referred to as a "snap".

The rates captured in this embodiment include:
bid and asked quotes against the USD for all relevant currencies (over 100 in number)
bid and asked quotes against the EUR for selected currencies where the primary quotations are against the EUR and
bid and asked trading rates The data capture component is designed to run continuously and independently of the all components except the data storage component (database). It can be a completely separate process within the application, and in other embodiments can be a separate application altogether. Its only purpose is to acquire snaps of the quote and trade data, and to pass this data to the data storage component. It has no significant user interface.

Continuous Validation (Step 90)

Some simple validation is performed on the snapped data before it is passed to the data storage component.

The data capture component captures two types of data: quote data and trade data, as detailed above. Data will be discarded if:
The data is not in the correct form (e.g. if a letter is found where a number was expected, etc.)
The base currency is neither USD nor EUR.
The variable currency does not have a known 3-letter ISO code.
The variable currency is a calculated currency.

No other validation need be performed by the data capture component—all further validation will be performed by the data validation and fixing component after the data has been stored in the database.

The continuous validation process 90 validates the incoming data on an on-going basis, and not only during the fixing periods. This means that there is less checking to do at the time of fixing, so that it is possible to release the fixed rates to the media more quickly.

In one embodiment of the validation process 90 the captured rates for each component source are validated at every fifteen second "snap" using the following steps:
(a) Calculate % movement from previous snap.
(b) Calculate % movement from n-th previous snap.
(c) Compare % s with standard deviation tolerance over a number of snaps.
(d) Calculate % deviation from peg (if applicable) and compare with threshold.
(e) Calculate bid/asked price spread and compare with threshold.
(f) Check bid rate is smaller than asked rate The peg rate here is defined as the rate at which one currency is fixed or related to another currency rate, and the % deviations from peg rates are calculated for specific currencies, e.g. the Hong Kong Dollar (HKD). The price spread is the difference between the bid and asked prices. Some sources for certain currencies may be in a position only to quote bid or ask prices, but not both.

The new sample is considered valid only if all of the above criteria (a) to (f) are met. The thresholds and other parameters used in this process can be set and varied according to requirements. For example, tolerances can be set to give more or less strict limitations on how much a currency is allowed to vary from its last sampled rate, from earlier samples, and with respect to others currencies. Based on experience of the markets, the managers of the apparatus can set these parameters for each specific currency so as to trap errors in individual samples sufficiently reliably, but without discarding too much valid data, and without requiring excessive manual intervention. The stored parameters in such cases can include instructions to waive certain of the criteria (a) to (f) of the validation steps carried out under step 90.

Figure 4:
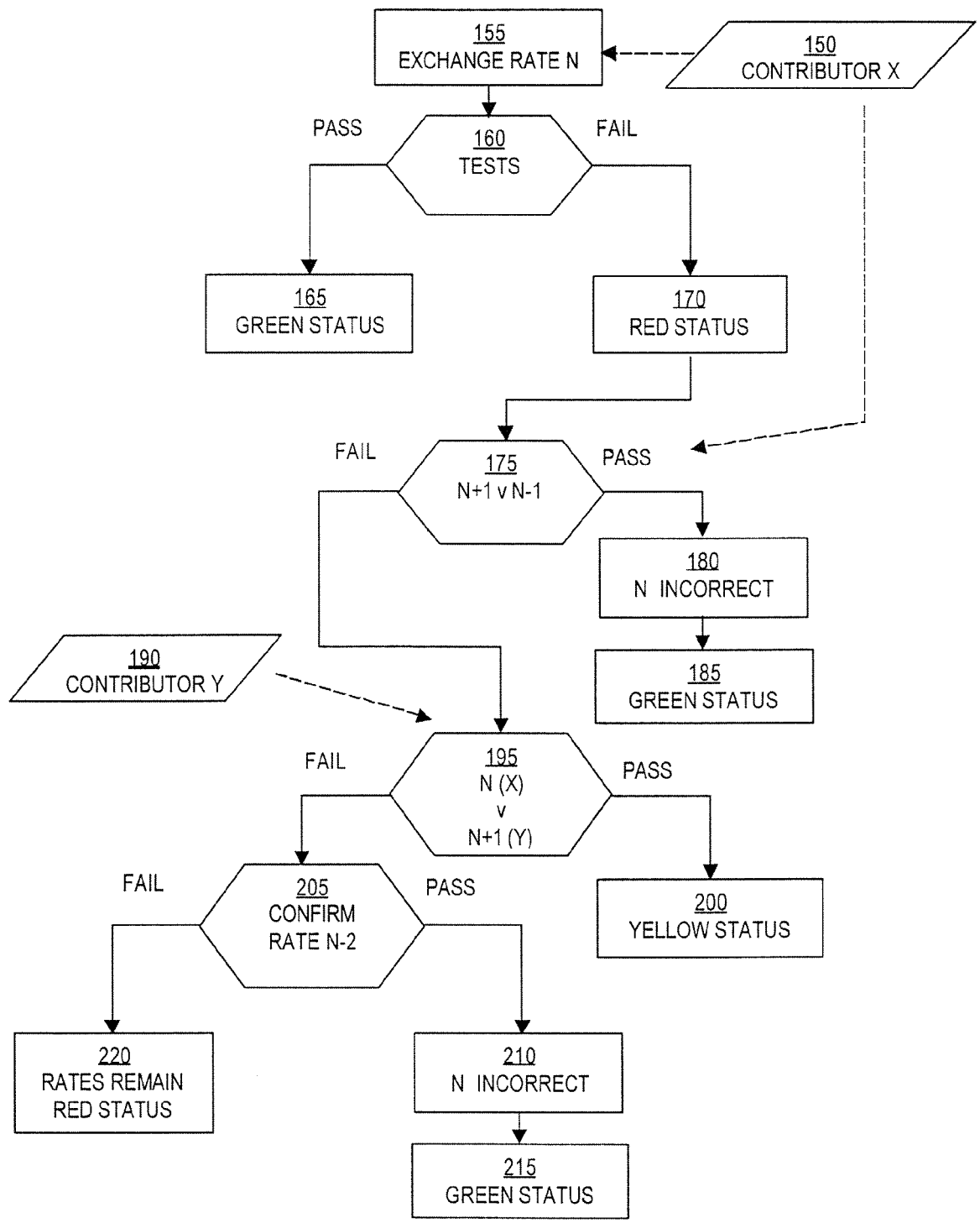
FIG. 4 is a flow chart illustrating in more detail an automatic pre-validation process within the process of FIG. 3.

FIG. 4 is a flow diagram illustrating how the above tests (a) to (f) are used in step 90 in continuously monitoring the validity of quotes received for each exchange rate in accordance with one embodiment of the invention. The process continues in parallel for each exchange rate, and for each different snap. Each sample has an associated status "green" (meaning valid), "yellow" (questionable) and "red alert" (highly questionable).

A new quote or trade sample for a given currency is received at 155 from one of the selected contributors 'X' at 150. This rate sample is labelled N. On passing the various tests (a) to (f) at step 160 the sample N will be flagged at 165 with a "green" status to indicate its validity for use in further calculations. If the sample fails any of the tests it will be marked at 170 with a "red alert" status 170. However, the red alert status can be removed or modified, with or without manual intervention, depending on previous and subsequent samples received from the same and/or different contributors. In particular, if the next sample (N+1) captured at 175 confirms a previous sample (N−1), for which the status was green, the sample N alone is marked at 180 as incorrect and at 185 the status is returned to "green". Samples flagged as incorrect will be ignored in the fixing process 100 (FIG. 3). Tolerance limits will be in operation here for the values involved.

If the sample N causing the "red alert" fails the test at 175 but agrees with the next sample N+1 (Y) 175, received at 190 from a different contributor 'Y', this is detected at 195 and status is be changed at 200 to "yellow alert". When the status is "red alert" and the sample N+1 (Y) does not confirm the sample N, but does confirm (205) the rate prior to that (N−1 (X)), the sample N is again marked as an incorrect rate 210. The status of the later samples N+1 etc. is returned to "green" at 215. When the status of a rate is "red alert" and the next sample from contributor Y does not confirm the previous sample and does not confirm the sample before that (N−2), the rates will remain on "red alert".

An alternative and more detailed embodiment of the how the quotes and trade quotes are handled will now be presented.

Snaps and Snap Calculation

In this embodiment both quote and trade snaps can be uniquely referred to by a combination of snap time, base currency ISO code, and variable currency ISO code (e.g. 15:59:15, USD, JPY). It follows that there can be only one snap value for a given pair of base & variable currencies at any one point in time. (Quotes and trades are considered independent, and so there can be both a quote snap and trade snap).

Furthermore, for both quote and trade snaps, any pair of currencies may have only one record at a given point in turn. In other words, it will not be possible to have two records with the same two currencies for the same snap time, even if the roles of those currencies (base/variable) are reversed. For example, it will not be possible to have both a time:USD:JPY triplet and a time:JPY:USD triplet.

The reason for this restriction is that it is possible to derive a time:Y:X rate from a time:X:Y rate simply by taking the reciprocal, and so if both rates were stored either (a) there would be redundant data or (b) there would be inconsistent data.

All quote snaps can be stored in the QuoteSnap table, which will have the time:base:variable triplet as its key. A field within the table will identify the source of the snap (i.e. Reuters, bank page, etc.). The fields of this table can cover such attributes as the time the snap was taken, The ISO codes for the base and variable currencies, the institution making the quote, and the status of the quote, as well as the bid and offer rates.

Similarly, all trade snaps be stored in the TradeSnap table, which will have the time:base:variable triplet as its key. A field within this table will identify which system the snap was received from.

As will be explained further below, each snap can be marked as anomalous, depending on predetermined criteria and previous snaps. Each quote snap further has an associated status (red, green or yellow) as described above. This status is set automatically by the application based on whether the quote falls within certain tolerances. The operator can also manually override the status of any snap, in which case an entry is added to a table which is used to provide indicators about the status of the snap.

This table acts as an audit trail of the manual overrides that have been made to the status of the snapped quote data. The snap to which the override applies is identified by the time:base:variable triplet. Note that several overrides can be applied to the same snap value.

Some 'overrides' may not change the status of the snap. For example, if a snap whose status was automatically set to red was genuinely anomalous, then the operator may confirm that the snap should remain red, in which case a record would be added to the table indicating that the status remains red, and giving the operator's reason.

RTC Quote Snaps Algorithm

The algorithm for calculating the raw status of an RTC snap is as follows:

The data in the QuoteSnap record indicates which is the base and which is the variable currency for the snap data (base_curr_iso and variable_curr_iso).

Find a record in the Currency table whose curr_iso field matches variable_curr_iso and whose base_curr_iso field matches base_curr_iso. (Alternatively, find a record whose curr_iso field matches base_curr_iso and whose base_curr_iso field matches variable_curr_iso, and reverse the quote data by taking the reciprocals of the bid and offer and swapping them around).

Retrieve the currency-specific tolerances from the Currency record.

If no bid rate is given in the snap and allow_bid_only is not set, add an anomaly to the list.

If no offer rate is given and allow_offer_only is not set, add an anomaly.

If the quote is older than max_quote_age_secs, then add an anomaly.

If the bid-offer spread for the snap is less than min_snap_spread or more than max_snap_spread, add an anomaly.

If peg_curr_iso is set (the currency is a pegged currency)

Find the snapped rate for the peg currency, i.e. the entry in the database for the same time, whose variable currency is the pegged currency (in peg_curr_iso).

Note: if the peg currency is a calculated currency, there will be no snapped data, but it may still be possible to calculate a rate for the peg currency from snaps for other currencies.

If there is no rate available for the peg currency

Add an anomaly.

Otherwise (a rate is available for the peg currency)

Calculate the pegged bid and offer rates using pegged_bid and pegged_offer.

If the percentage differences between pegged bid and offer rates and the snap bid and offer rates are greater than max_peg_percent_diff, add an anomaly.
Find the data from the previous snap, i.e. the entry in the database exactly 1 snap-interval ago.
If there is no previous snap:
　Add an anomaly.
Otherwise (there is a previous snap):
　If the previous snap is red, add an anomaly.
　If the percentage difference between the bid rates or between the offer rates is greater than max_snap_snap_percent_diff:
　　Add an anomaly.
　　Set the reinforceable flag for this snap
Find the data from the snap num_n_snaps snaps ago.
If that snap is missing, or is not green:
　Add an anomaly
Otherwise (snap is green):
　If the percentage difference between the bid rates or between the offer rates is greater than max_n_snap_percent_diff:
　　Add an anomaly.
Find the data from the previous num_n_snaps−1 snaps.
If any of those snaps is missing, or they are not all green:
　Add an anomaly
Otherwise (all snaps are green):
　Calculate the standard deviation of the bid and of the offer rates
　If the standard deviation is greater than max_n_snap_deviation, add an anomaly
If there are no anomalies:
　Set this snap to green
Otherwise (there are some anomalies):
　Set this snap to red (for now)
The automatic reinforcement process may then modify the status, as follows:
If the only anomalies were caused by the previous snap being red or yellow, and the previous snap is reinforcable:
　If the institution code for this snap is different from the previous snap:
　　If the previous snap is yellow:
　　　Set the previous two snaps to green
　　　Set this snap to green.
　　Otherwise, if the previous snap is red:
　　　Set this snap to yellow.
　Otherwise (same institution code):
　　Set the previous snap to red Trade Snaps Algorithm The trade data for each of the snaps is validated according to the following algorithm:
The data in the TradeSnap record indicates which is the base and which is the variable currency for the snap data (base_curr_iso and variable_curr_iso).
　Find a record in the Currency table whose curr_iso field matches variable_curr_iso and whose base_curr_iso field matches base_curr_iso.
　(Alternatively, the following can be followed:
　find a record whose curr_iso field matches base_curr_iso and whose base_curr_iso field matches variable_curr_iso, and reverse the quote data by taking the reciprocals of the bid and offer and swapping them around.)
　Retrieve the currency-specific tolerances from the Currency record.
　If no bid rate is given in the snap and allow_bid_only is not set, then add an anomaly to the list.
　If no offer rate is given in the snap and allow_offer_only is not set, add an anomaly.
　If the age of the trade is greater than the max_trade_age_sees, then add an anomaly.

Fixed Spot Rates

Fixed spot rates are handled in a similar to quotes. It follows that there can be only one fixed spot rate for a given pair of base & variable currencies at any one fix time.

Furthermore, any pair of currencies may have only one record at a given point in turn. In other words, it will not be possible to have two records with the same two currencies for the same fix time, even if the roles of those currencies (base/variable) are reversed. For example, it will not be possible to have both a time:USD:JPY triplet and a time:JPY:USD triplet.

The reason for this restriction is that it is possible to derive a time:Y:X rate from a time:X:Y rate simply by taking the reciprocal, and so if both rates were stored either (a) there would be redundant data or (b) there would be inconsistent data.

The override mechanism is essentially the same for the fixed spot rates as the snaps.

Hourly Fixing (Step 100)

As mentioned above, the fixing process carried out at 100 is centred at a time T, which in this embodiment occurs once every hour. The system captures all rates from T−1 minute at 15 second intervals to T+1 minute, making nine captures altogether. Centring the capture of rates more closely around the time of the fix (T) will make the fixed rates more closely aligned with trading rates. During the two minute fixing period, the validation of the data captured continues and any additional "red alerts" are logged. Any "red alert" or "yellow alert" still showing at the end of the fixing period will require manual investigation.

Based on the nine samples each of bid and ask quotes for a given currency, Median Bid and Median Asked values are calculated at 105 and subjected to the following further tests:
(g) Calculate bid/asked spread tolerance for median bid and median asked
(h) Check age of latest quote.
(i) Check for minimum number of different contributors
(j) Where trade rates are available (OTR1, OTR2), calculate % difference between median mid rates and trade mid rate (for certain currencies).
(k) Check USD quotes against EUR quotes converted to USD.

The median is defined as a value in an ordered set of values below and above which there is an equal number of values or which is the average of the two middle values if there is no one middle number. The number of snaps taken is always an odd number (normally 9), which ensures that the median bid and median offer correspond to the bid and offer rates of one of the snap values (had there been an even number of snaps, then the median might be midway between two snap values). Note however that in some cases, the median bid and median offer may correspond to the bid and offer rates from two different snaps.

The various parameters applied in these tests can again be varied according to requirements and according to the expected behaviour of each currency.

At the conversion stage at the end of this process outline above, the EUR rates are first converted into USD, along with the calculated fixed spot rates. After all the rates have been converted into USD, the USD quotes are then compared against the rates converted from EUR into the USD quoted rates. Additionally, the mid trade rates are compared against the mid quotes.

If the comparisons meet pre-determined standards then the available Trade rate(s) is or are used to determine the fixed currency rate. Thus, in the present embodiment, only the traded rates are used in fixing the hourly rate, provided that they do not disagree violently with the received quotes. If the comparisons fail then the rates must undergo a manual validation process. After the rates have been validated and converted they are output 115 as separate files for each currency. As shown in FIG. 2 and previously described, the files can be output through a number of channels 25. Converted Rates are rounded to 4 decimal places—e.g. Y/$100.0000 yields Y/£150.4136666—giving $/£1.5041.

Fixing Algorithm

A more detailed account of an embodiment for the fixing validation process will now be given.

The algorithm for validating the fix data is as follows. Firstly, the raw status for all of the relevant RTC quote snaps is calculated according to algorithm described above.

The following checks are also applied:
Calculate the median mid and median offer of the snap data, and average these to find the median mid.
Use the times of the last snap as the basis for the data_time_gmt associated with the fix.
If the currency is a EUR-based currency:
  Find the USD-based snaps for the same currency.
  If not all of the USD-based snaps are available:
    Add an anomaly.
  Otherwise (USD snaps are available):
    Calculate the median bid and median offer, and thus the mid for the USD rate.
    Use the EUR:USD rate to convert the USD rate into EUR terms.
    If the percentage difference between the converted mid and the fixed mid is greater than max_eur_usd_fix_percent_diff, add an anomaly.
    Otherwise, use the EUR based rate.
If use_ebs_data or use_d2x_data is set for the currency:
  Find the corresponding trade snaps.
  If not all of the trade snaps are available:
    Add an anomaly.
  Otherwise (trade snaps are available):
    Check each trade snap according to the algorithm above
    If any of the trade snaps is rejected:
      Add an anomaly.
    Otherwise (all trade snaps OK):
      Calculate the median bid and median bid of the trade snaps, and thus the mid.
      If the percentage difference between the trade mid rate and the fixed mid rate is greater than max_fix_trade_percent_diff:
        Add an anomaly.
      Otherwise (trade data within range):
        Use the trade bid and offer for the fix in preference to the calculated bid and offer (and use the time of the trade as the data_time_gmt associated with the fix).
If the percentage spread between the fixed bid and offer is less than min_fix_percent_spread or more than max_fix_percent_spread then add an anomaly.

Operator Interaction and User Interface

The application is designed primarily as a single-user system in that only one user at a time will be able to use the application in a supervisory/examiner type mode. The user interface is constructed here as a series of fixed size modal boxes.

Figure 5:
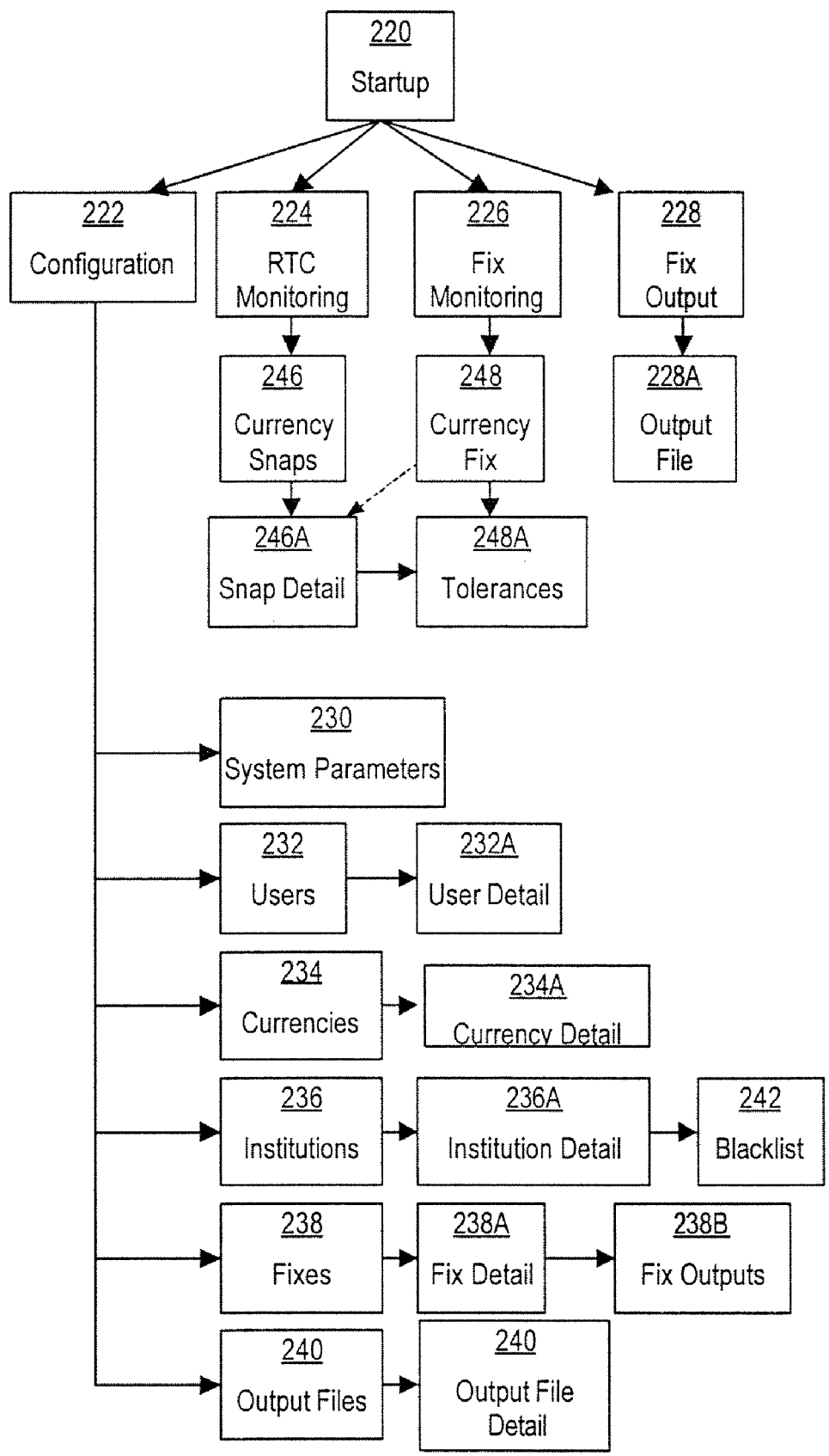
FIG. 5 is a diagram of the flow of control between different parts of one embodiment of the invention.

FIG. 5 shows the flow of control between different parts of the application for one particular embodiment of the invention. This shows the flow of control possible within the system from start-up and how the flow of control follows a well defined path.

From an initial start-up 220 the user can proceed to a configuration dialogue 222, RTC monitoring dialogue 2224, fix monitoring dialogue 226, or fix output dialogue 228.

The main "configuration" dialogue consists of options leading to further dialogues as shown in the diagram. The dialogue (and the dialogues to which it gives access) will only be available to operators with administrator privileges.

Note that any changes to the system configuration are not applied retrospectively. For example, if the tolerances for a currency are changed, then those changes will only affect any automatic checking carried out after the changes have been applied.

From the configuration dialogue 222 one can access dialogues for system parameters 230, users 232, currencies 234, institutions 236, fixes, 238 and output files 240.

The system parameters dialogue 230 will allow viewing/editing of the following parameters:
  Snap interval
  Length of time to preserve snap data before it is discarded
  How often (and at what time of day) to synchronise system time with external time source
  Allowable difference between system time and external time source before extra confirmation is required
  Allowable percentage difference between typed value and original value before extra confirmation is required The parameters will be presented as simple entry fields. (The dialogue box may be divided into tabs).

The user's dialogue 232 can display a list of all users registered to use the application. This particular dialogue should only be accessible to users with the required access level. This dialogue comprises a list having columns showing:
  The user ID
  The display name
  Whether the user is active
  The access level of the user This list is sortable by each of these columns, for example by name.

Other features include an "add" button that can be used to add new users to the system, and an "edit" button that can be used to edit the currently selected user in the list. Both of these buttons will lead to a "user detail" dialogue.

The "user detail" dialogue allows the operator to add a new user or edit an existing user. This dialogue may have input fields for each of the user's attributes, as shown below:
  User ID
  Display name
  Whether the user is active
  Password (displayed as asterisks)
  Whether the user has administrator privileges An operator with administrator privilege will be able to set the password for a user, in which case the password will immediately expire so that the user must change the password when logging in subsequently.

The dialogue will also display the expiry date of the user's password, and will have a button that can be used to force the password to expire immediately.

The "currencies" dialogue 234 displays a list of all currencies known to the application. This list has columns showing:
  The ISO code
  The "WM code"
  The display name
  Whether the currency is active
  The base currency
  Whether the currency is calculated or pegged
  (The "WM code" is an optional, code specific to the system operator, referred to in some output files for currencies)

This list is also sortable by each of these columns. The dialogue has an "add" button that can be used to add new currencies to the system, and an "edit" button that can be used to edit the currently selected currency in the list. Both of these buttons will lead to the "currency detail" dialogue.

The "currency detail" dialogue will allow the operator to add a new currency or edit an existing currency. Input fields or drop-down lists, etc. for each of the currency's attributes and tolerances will enable control of these parameters, with examples of such fields given below:
  For all currencies:
  WM code
  Display name of currency (e.g. "US Dollar")
  Whether the currency is active
  Preferred base currency (USD or EUR)
  Whether the currency is quoted inverted
  Number of decimal places to use on output
  Whether EBS trade data should be captured for the currency
  Whether D2X trade data should be captured for the currency
  Maximum age of quote used for snap
  Maximum age of trade used for snap
  Whether bid-only quotes are acceptable for snaps
  Whether offer-only quotes are acceptable for snaps
  Minimum spread between bid and offer rates in snaps
  Maximum spread between bid and offer rates in snaps
  Maximum percentage difference between bid rates (and between offer rates) from adjacent snaps
  Maximum percentage difference between bid rates (and between offer rates) from snaps i and i–n
  Maximum standard deviation of bid rates (and of offer rates) over n snaps
  Value of n for the preceding 2 checks
  Minimum number of different institutions represented in snaps during fix period
  Minimum spread of fixed bid & offer
  Maximum spread of fixed bid & offer
  Maximum percentage difference between fixed mid rate and median mid of trade rates
  (EBS and D2X are sources of trade quotes)
  For EUR-based currencies:
  Maximum percentage difference between fixed mid rate calculated from USD-based data and that calculated from EUR-based data converted to USD.
  For pegged currencies:
  ISO code of peg currency
  Pegged bid and offer rates relative to peg currency
  Maximum percentage difference between fixed and pegged bid and offer rates
  For calculated currencies:
  Formula for calculating the fixed spot rate from other currencies. (Exactly how this formula is expressed will be determined during the design phase).

The institutions dialogue 36 displays a list of all institutions known to the application. This list may have columns showing:
  The institution code
  The display name
  Whether the institution has been blacklisted in relation to any currency The list will be sort-able by each of these columns. The dialogue also has an "add" button that can be used to add new institutions to the system, and an "edit" button that can be used to edit the currently selected institution in the list. Both of these buttons will lead to the "institution detail" dialogue. Institutions may also be added automatically by the system if previously unknown institution codes appear in the quote or trade data.

The "institution detail" dialogue 236A allows the operator to add a new institution or edit an existing institution. The dialogue may have input fields for each of the institution's attributes, with examples shown below:
  Institution code
  Display name The dialogue will also indicate whether the institution has been blacklisted in relation to any currency, and will have a "blacklist" button leading to the "blacklist" dialogue 242.

The "blacklist" dialogue 242 will show whether an institution has been blacklisted in relation to any currencies.

The dialogue will display two lists, which together will contain every currency known to the system. One list will show the currencies for which quotes should be accepted, and the other list will show the currencies for which quotes will cause an exception. The dialogue will contain buttons allowing the operator to move items between the two lists.

The name of the institution will be clearly displayed in the dialogue.

The "fixes" dialogue 238 displays a list of all fixes known to the application. This list will have columns showing:
  The fix time in local time and in GMT
  The display name (e.g. "Main 4 pm Fix")
  Whether the fix is active The list is also sortable by each of these columns.

The dialogue has an "add" button that can be used to add new fixes to the system, and an "edit" button that can be used to edit the currently selected fix in the list. Both of these buttons will lead to the "fix detail" dialogue.

The dialogue also has a "outputs" button that can be used to set the outputs for the selected fix. This will lead to the "fix outputs" dialogue.

The "fix detail" dialogue 232A allows the operator to add a new fix or edit an existing fix. The dialogue will have input fields for each of the fix's attributes, as shown below:
  Display name of fix (e.g. "Main 4 pm Fix")
  Whether the fix is active
  Number of snaps The dialogue will also have a "outputs" button that can be used to set the outputs for the fix. This will lead to the "fix outputs" dialogue 244.

The "fix outputs" dialogue allows the operator to specify which output files should be generated by default at a given fix. The dialogue displays two lists, which together will contain every type of output file known to the system. One list will show the outputs to be generated for the fix, and the other list will show the outputs not to be generated. The dialogue will contain buttons allowing the operator to move items between the two lists. The name of the fix for which outputs are being selected will be clearly displayed in the dialogue.

The "output files" dialogue 240 displays a list of all output files known to the application. This list will have columns showing:

- The display name (e.g. "Website Output File")
- The location (pathname and file name) where the output file should be placed locally
- The email address(es) to which the file should be sent
- The name of the FTP server to which the file should be sent The list can be sorted by display name. The dialogue has an "edit" button that can be used to edit the details of the currently selected output file in the list. This will lead to the "output file detail" dialogue.

Note that there is no user interface which allows the operator to add a new output file, since adding a new output file type will involve adding code to generate that file.

The "output file detail" dialogue 240A allows the operator to edit the details of an output file. The dialogue will have input fields for each of the output file's attributes, as shown below:

- Display name of output file (e.g. "Website Output File")
- Location (pathname and file name) where the file should be placed locally
- Comma-separated list of email addresses to which the file should be sent
- Name of the FTP server to which the file should be sent
- Path on the FTP server where the file should be stored
- User name to be used to log onto the FTP server
- Password to be used to log onto the FTP server RTC Monitoring Dialogue The "RTC monitoring" dialogue 224 is one of the main dialogues in the application, and as the name suggests it is used to monitor the status of the round-the-clock (RTC) quote-snap data capture. It is likely that this is the dialogue that will be displayed on the screen most of the time (except immediately after a fix, when the "fix monitoring" dialogue will be displayed).

The primary purpose of this dialogue will be to alert the operator to any 'anomalies' in the snap data. The dialogue will therefore have a prominently-displayed summary of this information at the top of the dialogue, including:

- How many currencies are currently at 'red' (i.e. the last snap was anomalous)
- How many currencies are currently at 'yellow'
- How many outstanding anomalies there are in total (those that have not been automatically cleared or manually confirmed—in other words, those red or yellow snaps for which no corresponding entry exists in the table containing the information on quote snap status overrides).
- How many currencies have any outstanding anomalies (some currencies may have several outstanding anomalies if several snaps were anomalous).

Note that a currency may have an outstanding anomaly (from some time ago) even if its current status is green.

For example, the summary may be expressed as: "3 currencies are currently red; 4 are yellow. There are 15 outstanding anomalies in total. 9 currencies currently have outstanding anomalies".

Additionally, the dialogue will contain a list of all currencies, showing:

- The ISO code
- The display name for the currency (e.g. "US Dollars")
- The ISO code of the base currency
- The current status (red, yellow or green)
- The number of outstanding anomalies
- The time of the last anomaly (i.e. the time of the snap at which the anomaly occurred)
- The current bid, offer and mid rates for the currency (from the last snap)

The list will be sortable by any of these columns except bid, offer and mid and will initially be sorted by current status, with red and then yellow currencies at the top of the list.

The dialogue also has a "view snaps" button, which will lead to the "currency snaps" dialogue 246 showing details of the snaps for the selected currency in the list.

Currency Snaps Dialogue

The "currency snaps" dialogue 246 shows all RTC snaps for a given currency, along with their status, etc. This dialogue contains the ISO code and display name of the currency, the ISO code of its base currency, and the number of outstanding anomalies for the currency.

This dialogue will also display a list of snaps for the currency, showing:

- The time of the snap
- The bid, offer and mid rates
- The status of the snap (red, yellow or green)
- Whether the snap has been confirmed (applies only to red and yellow snaps)

Again, this list will be sortable by each of these columns except bid, offer and mid, and will initially be sorted by snap time.

A button on the dialogue may be provided to allow the user to toggle between 'all snaps' and 'outstanding anomalies only'. While the dialogue is in the latter mode, only unconfirmed red and yellow snaps will be shown in the list. This will be the default view. So, when the dialogue is first displayed, the list will show the most recent unconfirmed red and yellow snaps at the top of the list.

The dialogue may also has a "snap detail" button, which will lead to the "snap detail" dialogue 246A for the currently selected snap in the list.

The "snap detail" dialogue 246A shows detailed information about a snap, and will also show enough additional information to allow the operator to decide whether to confirm or override the status of the snap.

The dialogue will show the following information about the currency:

- The ISO code for the currency
- The display name for the currency (e.g. "US Dollars") for the currency
- The ISO code of the base currency
- The pegged exchange rate, if the currency is pegged to the base currency The dialogue will also show the following information about the snap:

- The time of the snap
- The time of the associated with the snapped quote
- The bid, offer and mid rates for the snap
- The name of the institution providing the quote
- The status of the snap
- If the status is red, all of the reasons why
- Details of any override(s) already applied to the snap by the operator The dialogue will also contain a "tolerances" button, which will lead to the "tolerances" dialogue for the currency. Note that the description of the reason(s) why the snap is red will also contain details of the tolerances—for example "the bid-offer spread for the snap is 0.01; the minimum bid-offer spread is 0.02".

The dialogue will also show the all snapped quotes for the currency over the whole day as an aid to the operator. This information will be presented both as a graph and in tabular form (as a list). The list will show, for each quote:
 The time associated with the quote
 The display name of the institution making the quote
 The bid, offer and mid rates The list is sorted in time order. Note that there may be fewer quotes in this list (and fewer points on the graph) than there are snaps, since the same quote may persist over several snaps.

The dialogue will also show a more detailed graph of quotes either side of the snap. The operator will be able to scroll forwards and backwards in time. (The time-scale of the graph will be chosen so as to show a fixed number of quotes).

The dialogue will have an "enlarge graph" button, which will show the above graph full-screen.

The dialogue will also allow the operator to confirm/override the status of the snap, and provide a reason for doing so. This will create an entry in the table containing the quote snap status override information, and possibly change the status of the entry in the QuoteSnap table. (This may also affect other snaps using the same quote).

The status of the snap will be confirmed/overridden via two buttons labelled "accept rate" and "reject rate".

The reason can be entered into an edit field. A list of 'common' reasons will be provided in a drop-down list, which the operator can use to quickly set the initial contents of the edit field. (Having done this, the text thus inserted will still be editable).

Fix Monitoring Dialogue

The "Fix monitoring" dialogue 226 will be one of the main dialogues in the application, and as the name suggests it will be used to monitor the status of a fix.

On entry to this dialogue, the operator must select the fix to be viewed, by specifying a date and fix time. By default, this will be the latest available fix, and so the operator will normally accept the default. However, in some instances the operator may wish to review a previous fix, in which case a different date or fix time could be selected.

A fix will only be available in the dialogue after the fix period has passed—in other words, once all the snap data for the fix has been collected.

The primary purpose of this dialogue will be to alert the operator to any exceptions affecting the fix. The dialogue will therefore have a prominently-displayed summary of this information at the top of the dialogue, including how many currencies have unconfirmed exceptions.

Additionally, the dialogue will contain a list of all currencies, showing:
 The ISO code
 The display name (e.g. "US Dollars")
 The ISO code of the base currency
 Whether there is an exception for that currency
 Whether the exception has been confirmed
 The calculated bid, offer and mid rates for the currency The list can be sorted by each of these columns except bid, offer and mid, and will initially be sorted by status, with those currencies which have unconfirmed exceptions at the top of the list.

The dialogue has a "view fix" button, which will lead to the "currency fix" dialogue 248 showing details of the fix for the selected currency in the list.

"Currency Fix" Dialogue

The "currency fix" dialogue 248 will show detailed information about a fix for a currency, and will also show enough additional information to allow the operator to decide whether to confirm or override the fix.

The dialogue will show the following information about the currency:
 The ISO code for the currency
 The display name (e.g. "US Dollars") for the currency
 The ISO code of the base currency
 The pegged exchange rate, if the currency is pegged to the base currency The dialogue will also show the following information about the fix:
 The time of the fix
 The calculated median bid, offer and mid rates
 Whether there is an exception
 If there is an exception, all of the reasons why
 Details of any override(s) already applied to the fix by the operator The dialogue also contains a "tolerances" button, which will lead to the "tolerances" dialogue 248A for the currency. Note that the description of the reason(s) for an exception also contain details of the tolerances—for example "the bid-offer spread for the fix is 0.01; the minimum bid-offer spread is 0.02".

The dialogue will also show the snapped values that were used to calculate the median bid and offer rates, as well as the snapped trade rates, if available. This information will be shown in a list, with one entry for each snap, showing:
 The snap time
 The bid rate for the quote snap
 The offer rate for the quote snap
 The mid rate for the quote snap
 The display name of the institution providing the quote snap
 The status of the quote snap (red, yellow or green)
 The bid rate for the trade snap
 The offer rate for the trade snap
 The mid rate for the trade snap
 The difference between the mid rates for the quote and trade snaps This list is ordered by snap time.

Note that if any of the quote snaps for the fix are red or yellow, then this will automatically have caused an exception. However, the median bid and median ask will still be calculated using all of the snap data.

The dialogue has a "snap detail" button, which will bring up the "snap detail" dialogue for the selected snap in the list, thus allowing the operator to review the circumstances that caused a snap to be red, etc.

The snapped values (both quotes and trades) are also represented as a graph. (The time-scale for this graph will be based on the snap times, not the times associated with the corresponding quotes).

The dialogue also allows the operator to confirm/override the fixed spot rate, and provide a reason for doing so. This will create an entry in the FixedSpotRateOverride table, and change the bid and offer of the entry in the FixedSpotRate table. It will also change the date & time of the entry in the FixedSpotRate table to the time of the fix.

The fixed spot rate will be confirmed/overridden via two buttons labelled "accept rate" and "override rate". If the operator overrides the rate by pressing the "override rate" button, then a dialogue box will appear allowing the operator to enter a new bid and offer rate. If the operator enters a new bid or offer rate that differs by more than the pre-set percentage from the existing rate, then a confirmation dialogue will appear.

The reason will be entered into an edit field. A list of 'common' reasons will be provided in a drop-down list, which the operator can use to quickly set the initial contents of the edit field. (Having done this, the text thus inserted will still be editable). The dialogue will have a "next exception" button, which the operator can use to move straight to the next currency with an exception for the fix, without going back to the "fix motoring" dialogue. Because the operator may not go back to that dialogue, the summary data from that dialogue will be repeated in this dialogue, (i.e. the number of outstanding exceptions for both currency categories).

Tolerances Dialogue

The "tolerances" dialogue 248A will show the tolerances for a given currency, such as the minimum spread, maximum deviation from peg, etc. The tolerances shown will be a subset of those in the "currency detail" dialogue. The tolerances will not be editable in this dialogue.

Fix Output Dialogue

The "fix output" dialogue 228A allows the user to invoke the generation of output files for a fix.

On entry to this dialogue, the operator must select the fix for which output files are to be generated, by specifying a date and fix time. By default, this will be the latest available fix, and so the operator will normally accept the default. However, in some instances the operator may wish to produce output for a previous fix, in which case a different date or fix time could be selected.

The dialogue will allow the operator to specify which output files should be generated using the fix data. The dialogue will display two lists, which together will contain every type of output file known to the system. One list will show the outputs to be generated for the fix, and the other list will show the outputs not to be generated. The default contents of the "generate" list will be derived from the default set-up for the fix (stored in the FixOutputs table), as accessed via the "fix outputs" dialogue.

This dialogue contains buttons allowing the operator to move items between the two lists. Thus the operator can easily generate the default output files, but can also selectively add or remove output files.

The dialogue also contains a "distribute" checkbox, which will allow the operator to enable or disable the sending of the generated files by email or FTP. Thus, the operator may choose to generate and distribute the files in one step, or only to generate the files locally. By default, the checkbox will be unchecked, so that the user must explicitly ask for the files to be sent by email or FTP.

The dialogue contains a "generate output files" button, which when pressed will invoke the actual generation (and optionally the distribution) of the files in the "generate" list. The files will be placed in their pre-defined location on local media, and optionally sent to the appropriate email address(es) or FTP site.

Once all the files have been generated (and optionally sent), the application will display the "output status" dialogue 228A.

The "output status" dialogue 228A appears after the user has generated (and optionally sent) any output files.

This dialogue will shows the number of output files that could not be generated, and the number that could not be sent by email/FTP.

The dialogue also contains a list of the output files, sorted by name, showing:

The display name of the output file
The location of the output file as stored locally
Whether the output file was generated successfully (OK or FAILED)
Whether the output file was sent by email/FTP (YES, NO or FAILED)
A description of the reason that the file could not be generated or sent Note that information about what files were generated or sent is not stored in the database, nor is any information about any failed attempts to generate or send an output file.

Screen Displays

Figure 6:
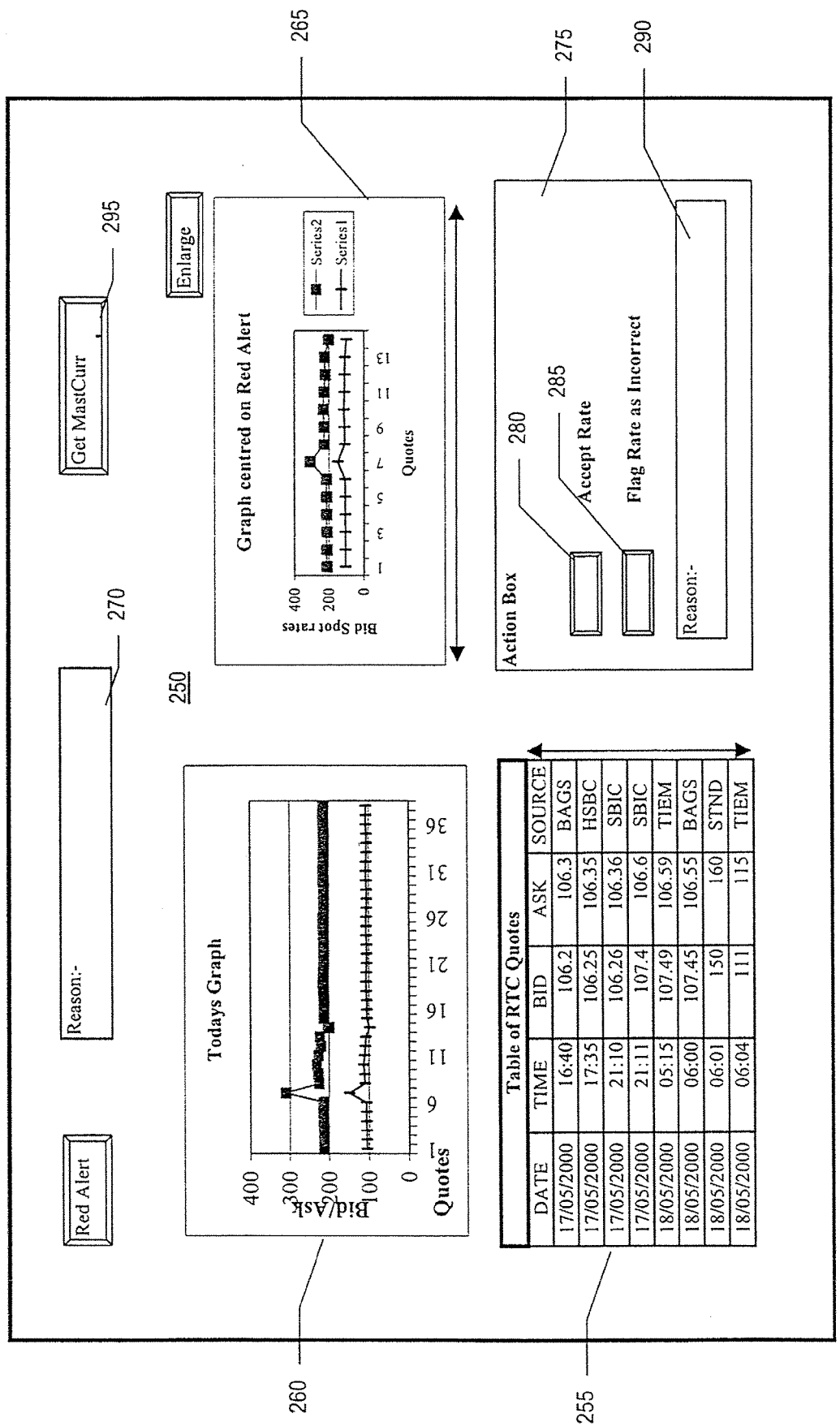
FIG. 6 is a sample display output generated for an operator of the apparatus of FIG. 2 during a data capture phase of the process of FIG. 3.
Figure 7:
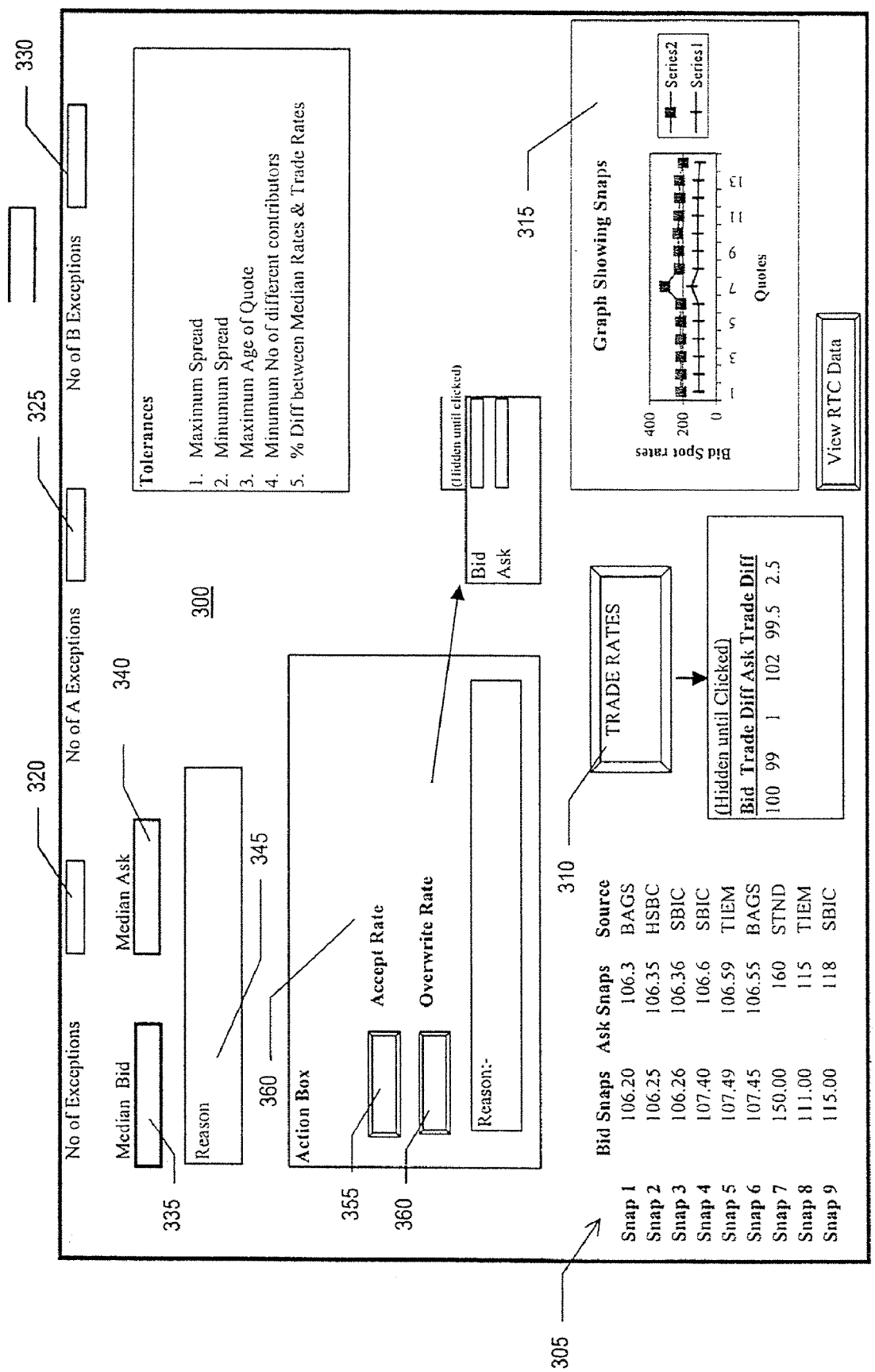
FIG. 7 is a sample display output generated for the operator at a fixing stage in the process.

FIGS. 6 and 7 show example display screens for embodiments of the currency snap and fix monitoring dialogues respectively, as discussed above.

FIG. 6 shows a screen display 250 for the output of the afore-described system as observable by a supervisor/examiner on the website or local terminal screen, as part of the ongoing validation process 90. This is a typical screen as used by the supervisor/examiner using the system. This shows the actual captured rates for a currency on a predefined period of time, in this case twenty four hours. It is through this medium that manual intervention can be taken in the fixing of the exchange rates. The display is geared to highlight quickly for the operator the red alerts and other problems, and to provide background information sufficient for a decision to be made.

The screen display 250 is divided into a number of portions. A quotes table 255 displays the quotes in tabular format which have been captured by the system. The table can incorporate an number of features and scroll up and down to show all the rates for one day. The table can display details about the quote such as the date and time of capture, the bid and asked pricing, and the source of the information. Although samples are taken every 15 seconds, the data itself from a given contributor may not have changed in hours. The time or "age" of data can be determined from the relevant fields in the data gathered with the rate samples themselves. Other information could also be displayed, for example mid point prices. The quotes are also displayed in graphical form 260. In this particular embodiment a simple graph is used with the bid and asked prices on the y-axis, and the quote value itself on the y-axis. Such graphical displays of the quotes allows trends and isolated anomalies to be readily identified.

A second graphical display 265 shows captured rates versus quote number/time of quote, but with the graph centred on a "Red Alert" event. Such a display can show any surrounding events about a red alert and show if there were any suspicious events leading up to it or as a repercussion of it. This display can be used to centre in on any red alert styled events over the period of observation, or events which meet predefined conditions. This allows the scrutiny of any events the user is interested in by the setting of parameters, and to identify time periods of interest to analyse in more depth. An "Enlarge" or zoom control allows a more detailed review.

Choosing a point on a graph with any suitable interface device, for example a mouse or through the use of a touch sensitive screen, the apparatus will display the rate for that time. Red alert events can also have user defined labels 270 listing the reason for the red alert. Needless to say, different types of event are shown and labelled in appropriate colour coding. Colour coding or different symbols, tags could also be used to indicate the contributor and other data, if desired.

An action box 275 is provided with means for the operator either to accept the rate 280 or flag the rate as incorrect 285. A manual user can interrogate a rate and accept it, causing that rate to turn green and written to a log. If the operator decides to flag the rate as incorrect the rate stays red and is marked to be ignored for future analysis. This action is then written to log, along with the operator's reason 290 for doing so.

A button 295 for displaying the tolerances for all currencies is provided. This can be in the form of a spreadsheet showing all the tolerance for the currencies. Other possible embodiments include the ability to set the values of the tolerances as parameters for display. There can also be set parallel display of tolerance parameters. For example, the red alert centred graphical display could be set to show both the red alert events for a standard set of tolerance parameters as well as a separate user defined set.

FIG. 7 is another sample display output 300, generated by the apparatus. This screen 300 displays information involved with the hourly fixing of the exchange rates. The sampled data (snap rates numbered 1 to 9) are displayed at 305 in tabular form. Button 310 enables more detailed information on a particular snap to be displayed. The snap to be examined can be chosen by any number of means, for example, mouse pointer or touch screen. A graph 315 shows the snaps in graphical form which allows for ease of identification of any anomalous behaviour. Any such anomalous behaviour is trapped by the system and highlighted, as detailed before.

Information on the exceptions to the tolerances set is displayed on screen 300 at 320, 325 and 330. The total number of exceptions 320 occurring for a currency are displayed, and this number is further broken down into the number of exceptions for bank rates 325 and for all other contributors 330. The reason for a particular exception can be displayed 345. Information on the median bid, median ask can also be displayed 345, 350.

The rates can be accepted 355 or declined 360 on manual input.

An advantage of the above apparatus and methods lies in the speed at which a reliable rate can be fixed and output to the channels 25 for use by subscribers. By using parallel version of rates, here the trading rates OTR1 and OTR2, and the quotes EUQ, it is possible to verify currency rates with a high degree of confidence. It will be seen that the apparatus described captures quotes to the EUR and uses these as the primary rates for publication where appropriate, which will improve the accuracy of the rates by avoiding re-conversion. Moreover the system also exploits data from on-line trading systems which display the rates at which banks are actually trading certain currencies. These rates are intrinsically superior to quoted rates for the same currencies which are indicative rates quoted by banks, not actual trading rates. This strategy also improves the accuracy of the rates and makes them more indicative of trading rates.

Application Example

Figure 8:
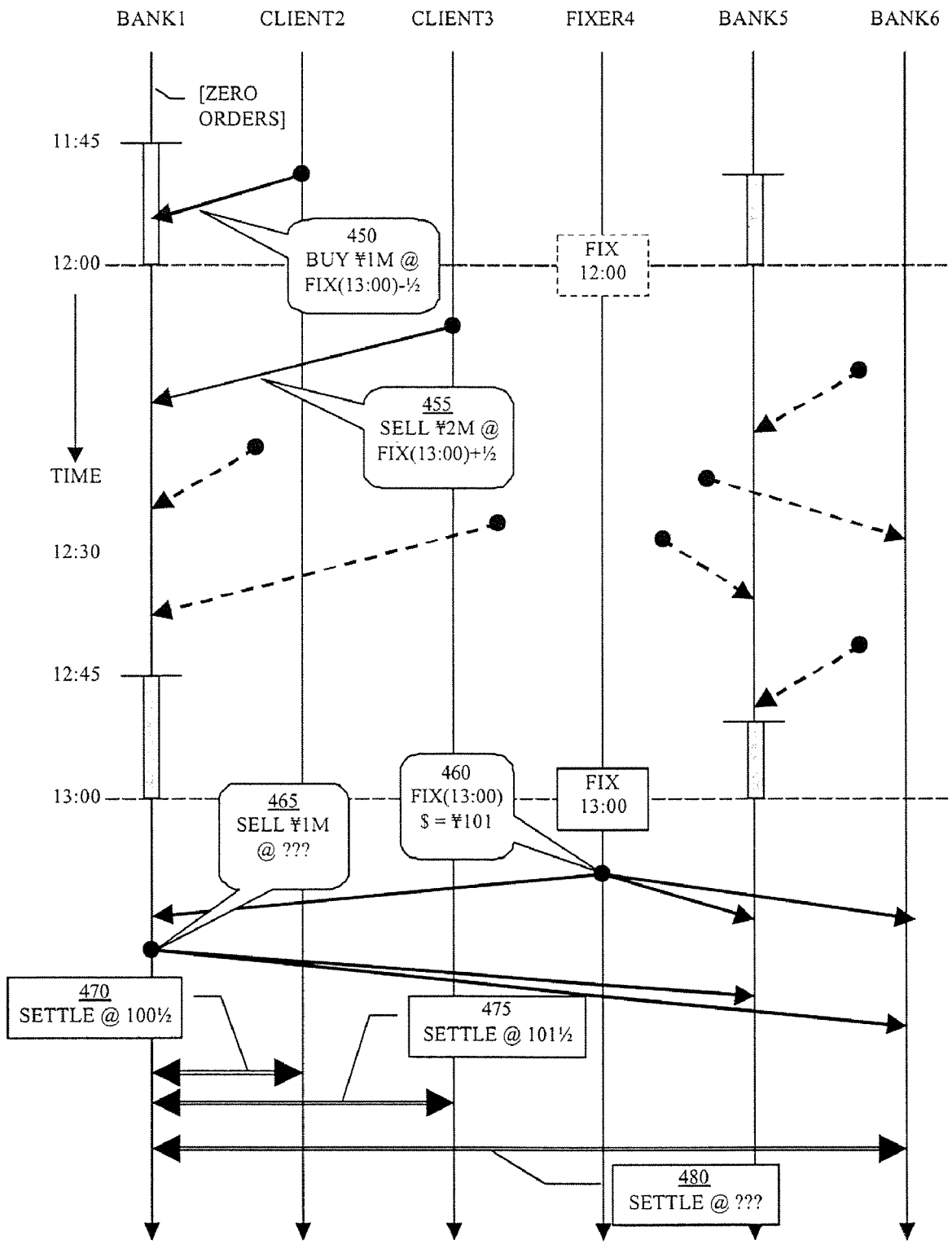
FIG. 8 illustrates a method of carrying out business transactions according to one embodiment of the invention.

FIG. 8 shows a number of parties operating in a currency market: BANK1, 5 and 6; CLIENT2 and 3; and FIXER4. For each party, a respective timeline is shown extending down the page. Over a period of hours in the middle of a typical business day, a number of transactions are first agreed upon then closed. The part played by each party in these transactions is shown on the respective timeline.

FIXER4 is the independent third party which fixes prices at which trades between other parties can take place. The other operators shown here are the traders and their clients between whom deals are made. FIXER4 using the apparatus and systems described above to provide prices accurately reflecting the market in question and checked for anomalies. This service in turn allows any number of contracts to be concluded more efficiently between the other parties, who agree to depend upon the service provided by the independent third party.

For example, in FIG. 8 it is assumed for simplicity that BANK1 has no outstanding orders for Yen at time 1145. CLIENT2 places an order 450 and thereby makes binding agreement with BANK1 at 1145 hours GMT to buy ¥1 million by reference to a price fixed by the independent third party at 1300 hours GMT. It is agreed that a spread of −0.5 will be taken on the price as fixed by the independent third party FIXER4. This spread can be a standard rate that BANK1 offers to its clients. Note in this example that the order placed by CLIENT2 falls in the fifteen minute period prior to the hourly fixing time at 1200 GMT. For practical reasons, BANK1 has a policy that orders placed within this window (shaded on the timeline for BANK1) must refer to the next fixing time, in this case 1300 hours GMT.

Another client of BANK1, labelled CLIENT3, later makes an order 455 with BANK1 to sell ¥2 millions by reference to the a price fixed by FIXER4 at 1300 hours GMT. It is agreed that a spread of +0.5 will be taken on the price as fixed by the independent third party.

At 1300 hours GMT the independent third party FIXER4 fixes 460 the rate at $1=¥101. Through the spread of ±0.5 agreed by BANK1 with its clients, FIXER4 thereby also fixes buy and sell prices for the orders 450 and 455, here giving a buy price of ¥100.5 and sell price of ¥101.5. It is at these prices the CLIENT2 and CLIENT3 buy and sell their currency from BANK1, these transactions being completed through the usual settlement channels at 470 and 475 respectively. Settlement typically follows two or three days later, in the normal operation of the markets, and the timelines beyond the fixing time 13:00 are thus not to scale.

In the meantime, by 13:00 GMT, BANK1 knows that it has now acquired through its dealings with CLIENT2 and CLIENT3 an excess of ¥1 million, compared with its position at 11:45. Typically BANK1 will wish to reduce its own exposure to the market by selling the excess Yen it has acquired during the past hour, at a price close to or higher than the price fixed by FIXER4. BANK1 at 465 then negotiates the sale of the excess to other banks BANK5 and BANK6, at the best price it can.

BANK1 gets the better price from BANK6 and concludes a deal on that basis. Settlement through the usual channels again occurs later, at 480.

In this example only the trades between 3 operators are shown for simplicity, and only in a single currency. The dashed lines here show other trades being carried out between operators. These could involve any combination of currency allowed by the system. Other trades could be offered by the same bank at different spreads, according to the size of the order, or the identity of the client. Different banks will compete to offer the lowest spread. Different traders may operate with different fixing times, not necessarily every hour. The "dead time" shaded prior to each fixing time may be shorter for a bank with more efficient operations. For example, BANK5 will accept an order up to 12:50, with reference to the 13:00 fix.

By providing information of a "guaranteed quality" interested parties can then trade with each other in confidence at an assured rate which is an accurate reflection of the market. They do not unnecessarily expose themselves to a wide spread imposed upon them from other dealers, the above described method providing (almost) a risk neutral dealing environment. Specifically, by offsetting orders against one another over the intervening period, and trading their excess only once, and close to the hour, exposure to market movements is greatly reduced for the banks and other traders, and eliminating a number of deals that would traditionally be conducted throughout the hour on an ad hoc basis.

Summarising the methods illustrated above, and assuming that currency fixes are produced every hour, a bank would guarantee to its customers to trade at the next fix provided orders are received up to, say, 10 minutes before the next fix.

The fix of the currency is provided at a mid rate. The guarantee given by the bank will be to trade at a bid/offer spread around that rate—the spread may vary depending on the client and depending on the amount of the currency. Buy and sale orders are received during the period up to 10 minutes before the fix time. At the time, the trader at the bank can aggregate all the buys against all the sales of the same currency pair and net them off against each other. He does not have to buy or sell any currency in the market to meet these orders—he simply takes all the currency from the sellers and can provide it to the buyers. The bank takes the whole spread from all the buys and sells as its income from these transactions. If the total amount of currency bought does not equal the total amount of currency sold, the bank will sell or buy the excess by trading with another bank—they will attempt to do this at the fixed rate or a better rate to maximise their income.

Figure 9:
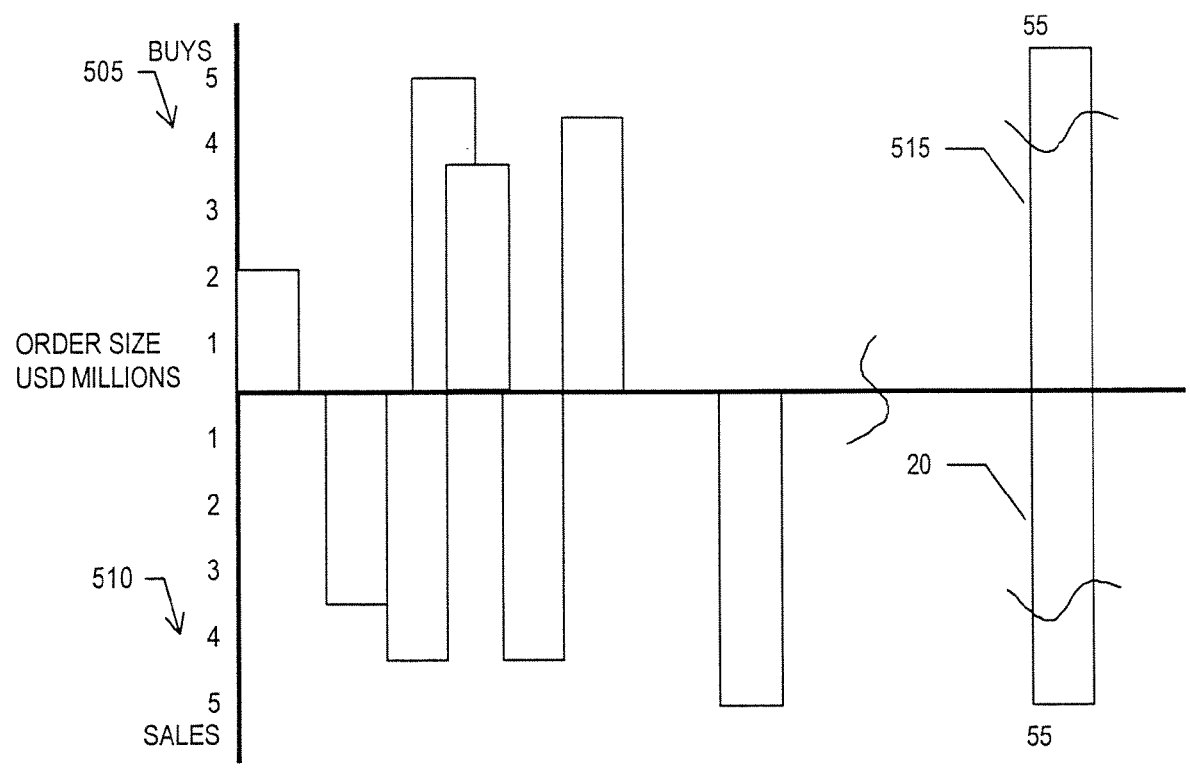
FIG. 9 is a diagram of customer usage of guaranteed rates at hourly intervals.

FIG. 9 is another diagram illustrating customer usage of guaranteed rates fixed at hourly intervals. This illustrates the advantages of being able to amalgamate a number of trades for trading at a fixed rate. A greater number of orders is shown than in the simple example of FIG. 8.

In FIG. 9 various orders for currency are shown as bars on a bar chart. Orders may be either buys 505 or sales 510. The size of orders is here shown in millions, with a base currency of dollars. The timeframe shown here is for example between 1000 hours GMT and 1100 hours GMT, running from left to right. After a cut-off time of 1050 hours GMT the individual transactions are shown as amounting to an aggregate buy order 515 of $55 millions and an aggregate sell order 520 of $45 millions (not to scale).

The application can also be used by other classes of user, for example investment institutions, credit card companies or corporate treasury departments. Benefits include not having to employ so many expensive people to watch the market and try to decide on the best time to trade. They do not have to check the rates their banks trade at for them to make sure the banks have bought/sold at the market rate at the time. Using a "neutral" third party which provides quality guaranteed rates allows for deals to be made with surety, and with a much lower overhead.

The system described above effectively establishes a method of doing business where there is effectively set up a contract between two parties to buy or sell at whatever price will be fixed by an independent third party at an agreed time in the future (for example, on the next hour, or that 16:00 the same day).

As mentioned in the introduction, currencies are cited as only one example of the commodities which can be traded in this way, and pricing could equally be for shares (stock) in a company, crude oil or coffee beans.

The invention claimed is:

1. An apparatus for periodically fixing a price of a currency, stock or commodity, the apparatus comprising computer and communications apparatus including:
   means for electronically receiving price samples of said currency or stock or commodity over a period of time;
   means for recording the received sample values so as to form an historical record of price samples from each source;
   means for filtering the received price sample values by reference to said historical record and predetermined validation criteria so as to categorise certain samples as valid or anomalous;
   means for utilizing the samples received during a fixing period, and for excluding samples categorised as anomalous, so as to derive a fixed price; and
   means for releasing said fixed price to users in response to deriving said fixed price.

2. An apparatus according to claim 1 wherein the recording means and filtering means are arranged to distinguish between price samples of different contributors within the samples received from a given source.

3. An apparatus according to claims 1 wherein the receiving means is arranged to receive from at least one source samples of trading prices paid in actual trade orders, in addition to non-binding prices quoted by other contributors.

4. An apparatus according to claim 1 wherein the source of trading prices comprises an online trading apparatus, wherein binding buy and sell orders incorporating prices are accepted and ranked by price in respective order lists, compatible buy and sell orders being matched automatically in order of price to conclude a transaction, the receiving means being arranged to receive successive samples of the current best price from each of the buy and sell order lists for use in deriving said fixed price.

5. An apparatus according to claim 1 wherein the filtering means is arranged to process trading prices and quoted prices each according to different criteria.

6. An apparatus according to claim 1 wherein the combining means is arranged to apply different processing to the trading prices and the quoted prices, to arrive at said fixed price.

7. An apparatus according to claim 1 wherein the combining means is further arranged to generate an average of price samples, in which trading prices are weighted higher than quoted prices.

8. An apparatus according to claim 1 wherein the combining means further disregards information derived from quoted prices in favour of information derived from trading prices, subject to predetermined validation criteria.

9. An apparatus according claim 8 wherein said validation criteria is such as to permit trading price information provided that it is within certain tolerance limits derived from the quoted prices.

10. An apparatus according to claim 1 wherein the filtering means is further arranged to categorise certain samples firstly as either valid or questionable depending on their relation to previous samples, and subsequently to re-categorise questionable samples automatically as valid or anomalous depending on samples received subsequently in accordance with predetermined criteria.

11. An apparatus according to claim 1 wherein the filtering means is further arranged to distinguish between price samples coming from various specific contributors, said re-categorisation being performed in a manner dependent on whether samples received subsequently are from the same contributor as the questionable sample or a different contributor.

12. An apparatus according claim 1 wherein the filtering means further include human intervention means for displaying questionable samples and surrounding data and for permitting human intervention to determine use or non-use of the questionable samples.

13. An apparatus according to claim 1 wherein the apparatus further includes means for defining finite fixing periods and intervening periods, each fixing period arising at a predetermined time of day.

14. An apparatus according to claim 13 wherein each fixing period extends one minute either side of the hour, throughout the business day.

15. An apparatus according to claim 13 wherein said filtering means is arranged to operate throughout said fixing periods and intervening periods, samples received during said intervening periods serving as a reference for the categorisation of samples received during said fixing period.

16. An apparatus according to claim 1 wherein both exchange rate quotes and bank quotes are captured on a round-the-clock (RTC) basis, by sampling (snapping) the data at regular intervals.

17. An apparatus according to claim 1 wherein only those samples (snaps) that fall within a fix period are used to calculate a fixed spot price, while other samples are used to monitor the behaviour of the market, so that anomalies which may impact the next fix can be identified and analysed ahead of time.

18. A method of trading in a currency, stock or commodity by a dealing party, the method comprising:
   (a) the dealing party accepting from a plurality of clients binding orders to trade quantities of said currency, stock or commodity, wherein the prices of said trades is not fixed at the time of accepting the order but being defined by reference to a reference price to be fixed at a specified fixing time applying a predetermined methodology to price samples received from competing sources, and wherein the applied methodology is independent of any position that is held by the dealing party in said currency, stock or commodity and comprises
   (a1) a computer receiving price samples of said currency over a period of time;
   (a2) a computer recording the received sample values so as to form an historical record of price samples;
   (a3) a computer filtering the received price sample values so as to categorise certain samples as valid or anomalous;
   (a4) a computer utilizing the samples categorised as valid, and excluding the samples categorised as anomalous, so as to derive a fixed price;
   (b) the dealing party receiving after said fixing time a record of the reference price fixed at the fixing time; and
   (c) the dealing party settling each of the accepted orders with the respective clients in accordance with said prices defined by reference to the reference price.

19. A method according to claim 18 wherein said price is fixed at a series of predetermined fixing times throughout the day, the steps (a) to (c) being repeated in relation to each fixing time.

20. A method according to claim 18 where for step (a), orders are accepted during a predetermined period ending in advance of the fixing period, and orders received after the end of said fixing period being accepted with reference to a later fixing period.

21. A method according to claim 18 wherein the method further comprises:
   (d) the dealing party offsetting a plurality of buy and sell orders received from clients prior to the fixing period to determine a balance of said currency, stock, or commodity traded with reference to the fixed price;
   (e) the dealing party dealing in an open market to reconcile the balance, the volume of such trading being substantially less than the aggregate of the buy and sell orders accepted.

22. A method according to claim 18 wherein the reference price is a mid rate and the prices in buy and sell orders accepted by said dealing party are defined in terms of their spread either side of the reference price.

23. A method according to claim 22 wherein said dealing party accepts orders from different clients with different spreads.

24. A method according to claim 18 wherein at least one other dealing party accepts offers from clients for which the prices are defined by reference to the same reference price, but with different spreads.

25. A method according to claim 18 wherein said methodology refers to samples of quote data to verify samples of trade data to be used.

26. A method according to claim 20 wherein said methodology includes sampling traded prices from a electronic trading system, the transactions between clients and dealing party being conducted outside that trading system.

27. A method according to claim 18 wherein said methodology includes sampling traded prices from at least one electronic auction market trading system to which the dealing party has access, said balance being traded in said trading system.

28. An computer implemented method of periodically fixing a price of a currency, stock or commodity to be transmitted to users to facilitate the users to trade using the fixed prices, comprising the steps of:
   a computer receiving successive price samples of said currency, stock or commodity over a period of time comprising a fixing period within said period of time, and intervening periods outside of said fixing period;
   a computer determining at least one historical record for the received price samples;
   a computer assigning said price samples into price samples received within said fixing period and price samples received within said intervening periods;
   a computer filtering the received price samples with the at least one historical record by comparing said price samples received within said fixing period with predetermined validation criteria to determine whether said price samples received within said fixing period are valid or anomalous;
   a computer utilizing said received price samples within said fixing period while excluding the anomalous samples and determining a fixed price responsive thereto; and
   transmitting said fixed price to the users to facilitate said users to trade using said fixed prices.

29. A computer implemented method of real time acquisition and evaluation of trading data comprising a fixed price of a currency, stock or commodity to be transmitted to users to facilitate the users to trade using the trading data using the fixed price, comprising the steps of:
   a computer receiving data samples comprising a fixing period within said period of time, and intervening periods outside of said fixing period;
   a computer determining at least one historical record for the received data samples;
   a computer assigning said data samples at least one indicator value indicating a level of confidence in said acquired data samples according to predetermined parameters and said historical record;
   a computer filtering the received data samples based on the indicator value associated with each of the data samples and removing the received data samples having the indicator value greater than a defined tolerance level;
   a computer determining the fixed price of the currency using said filtered data samples;
   transmitting said fixed price to the users to facilitate said users to trade using said fixed prices.

30. A method according to one of claims 28 or 29, further comprising the step of determining the fixed prices using at least one agreed valuation methodology based on predetermined criteria defined by a contractual relationship between said dealing party and said plurality of clients.

31. A method according to claim 30, further comprising the step of continuously validating said received samples.

32. A method according to claim 31, wherein said continuously validating step further comprises the step of continuously validating said received samples on an on-going basis, and not only during the fixing period, thereby minimizing said filtering step at the time of fixing, and transmitting the fixed rate to the users responsive to same.

33. A method according to one of claims 28 or 29, further comprising the step of synchronizing a system clock with an external time source used by said method when determining the fixed price to avoid drift.

34. A method according to one of claims 28 or 29, further comprising the step of at least one of: calculating percent movement from a previous fixing period, calculating percent movement from multiple previously fixing periods, comparing with a standard deviation tolerance over a plurality of fixing periods, calculating a bid/ask price spread, and determining whether a bid rate is smaller than an asked rate.

35. A method according to one of claims 28 or 29, further comprising the step of removing the received sample responsive to at least one of the following: when the received sample is not in a correct format, when the received sample comprises a base currency that is neither USD nor EUR, when the received sample comprises a variable currency that does not have a known 3-letter ISO code, and when the received sample comprises a variable currency indicative of a calculated currency.

36. A method according to one of claims 28 or 29, further comprising the step of generating an average of price samples, in which trading prices are weighted differently than quoted prices, and said determining step further comprises determining the fixed price using said filtered data samples and the average of price sample.

37. A method according to one of claims 28 or 29, wherein said receiving step further comprises at least one of the steps of:
    capturing first rates for bid and asked quotes against the USD for a first plurality of currencies;
    capturing second rates for bid and asked quotes against the EUR for a second plurality of currencies having primary quotations against the EUR; and
    capturing bid and asked trading rates, and
    wherein said determining step further comprises the step of determining the fixed price using said filtered data samples including at least one of the first rates, the second rates and the bid and asked trading rates.

38. A method according to one of claims 28 or 29, further comprising the step of determining the fixed prices by amalgamating a number of trades for trading at a fixed rate.

39. A method according to one of claims 28 or 29, further comprising the step of determining the fixed prices by amalgamating a number of trades for trading at a fixed rate.

40. A method according to one of claims 28 or 29, further comprising the step of enabling the offering of different spreads by different banks simultaneously using a number of different currencies, according to at least one of order size and identity of the user.

41. A method according to one of claims 28 or 29, further comprising the step of determining parallel version of rates for verification of currency rates including rates at which banks are actually trading predetermined currencies.

42. A method according to one of claims 28 or 29, further comprising the step of validating the received samples comprising captured rates, said validating comprising the steps of:
    calculating first percentage movement from previous data capture;
    calculating second percentage movement from n-th previous data capture;
    comparing the first ands second percentage with a standard deviation tolerance over a predetermined number of the data capture;
    calculating a percentage deviation and comparing the percentage deviation with a first predetermined threshold;
    calculating a bid/asked price spread and comparing the bid/ask spread with a second predetermined threshold; and
    determining whether the bid rate is smaller than an asked rate.

43. A method according to one of claims 28 or 29, wherein said receiving step further comprises the step of capturing quote and trade samples, each comprising corresponding base and variable currencies, and wherein said determining step further comprises the step of determining the fixed price using quote and trade samples.

44. An apparatus for periodically fixing a price of a currency, stock or commodity, the apparatus comprising computer and communications apparatus arranged:
    (i) to receive from at least one electronic trading system samples of trading prices corresponding to an asset;
    (ii) to receive from at least one other information source quote information for the same asset;
    (iii) to validate the samples of trading prices and the quote information for the asset according to predetermined criteria including criteria using previous quote samples as a reference;
    (iv) to determine by further predetermined criteria if there are sufficient validated trading price samples received during a fixing period to derive from said trading price samples a price fix for the currency/stock/commodity; and
    (v) to calculate the price fix for the currency, stock or commodity from one of: the samples of trading prices if a sufficient number of trading price samples has been received during the fixing period and the quote information if the sufficient number of trading price samples has not been received during the fixing period.

45. An apparatus according to claim 44 arranged to fix prices for several currencies, stocks or commodities in parallel, wherein said criteria for validating trading prices include criteria generic to the currency, stocks or commodities and criteria tailored to the individual stocks.

46. An apparatus according to claim 44, wherein the source of trading prices comprises an online trading apparatus, wherein binding buy and sell orders incorporating prices are accepted and ranked by price in respective order lists, compatible buy and sell orders being matched in order of price to conclude a transaction, the receiving means being arranged to receive successive samples of the current best price from each of the buy and sell order lists for use in deriving said fixed price.

47. An apparatus according to claim 46 wherein said fixed price is a mid price calculated as the mid value between a median of the sampled buy order prices and a median of the sampled sell order prices.

48. An apparatus according to claim 44 wherein the filtering means is arranged to process trading prices and quoted prices each according to different criteria.

49. An apparatus according to claim 44 wherein the combining means is arranged to apply different processing to the trading prices and the quoted prices, to arrive at said fixed price.

50. An apparatus according to claim 44 wherein the combining means is further arranged to generate an average of price samples, in which trading prices are weighted higher than quoted prices.

* * * * *